(12) United States Patent  
Privault et al.

(10) Patent No.: US 8,165,974 B2
(45) Date of Patent: Apr. 24, 2012

(54) SYSTEM AND METHOD FOR ASSISTED DOCUMENT REVIEW

(75) Inventors: Caroline Privault, Montbonnot-Saint-Martin (FR); Jacki O'Neill, Grenoble (FR); Jean-Michel Renders, Quaix-en-Chartreuse (FR); Victor Ciriza, La Tour du Pin (FR); Yves Hoppenot, Notre Dame de Mesage (FR)

(73) Assignee: Xerox Corporation, Norwalk, CT (US)

( * ) Notice: Subject to any disclaimer, the term of this patent is extended or adjusted under 35 U.S.C. 154(b) by 527 days.

(21) Appl. No.: 12/479,972

(22) Filed: Jun. 8, 2009

(65) Prior Publication Data

US 2010/0312725 A1    Dec. 9, 2010

(51) Int. Cl.
  G06F 15/18    (2006.01)
  G06F 5/00    (2006.01)
  G06F 17/00    (2006.01)

(52) U.S. Cl. ............................. 706/12; 706/45; 715/200

(58) Field of Classification Search ........................ None
  See application file for complete search history.

(56) References Cited

U.S. PATENT DOCUMENTS

| | | | |
|---|---|---|---|
| 6,493,711 B1 | 12/2002 | Jeffrey | |
| 6,708,165 B2 | 3/2004 | Jeffrey | |
| 7,139,754 B2 | 11/2006 | Goutte et al. | |
| 7,433,883 B2 | 10/2008 | Jeffrey | |
| 7,457,808 B2 | 11/2008 | Goutte et al. | |
| 2003/0084040 A1 | 5/2003 | Jeffrey | |
| 2003/0101187 A1 | 5/2003 | Gaussier et al. | |
| 2004/0177088 A1 | 9/2004 | Jeffrey | |
| 2005/0060643 A1* | 3/2005 | Glass et al. | ................ 715/501.1 |
| 2007/0005340 A1 | 1/2007 | Goutte et al. | |
| 2007/0005639 A1 | 1/2007 | Gaussier et al. | |
| 2007/0143101 A1 | 6/2007 | Goutte | |
| 2007/0150801 A1 | 6/2007 | Chidlovskii et al. | |
| 2007/0239745 A1 | 10/2007 | Guerraz et al. | |
| 2007/0258648 A1 | 11/2007 | Perronnin | |
| 2008/0069456 A1 | 3/2008 | Perronnin | |
| 2008/0147574 A1 | 6/2008 | Chidlovskii | |
| 2008/0249999 A1 | 10/2008 | Renders et al. | |

OTHER PUBLICATIONS

H5 Technologies: *Litigation and Investigations*, http://www.h5.com/about/index.html, downloaded May 12, 2009, copyright 2000-2009.

(Continued)

*Primary Examiner* — Alan Chen
(74) *Attorney, Agent, or Firm* — Fay Sharpe LLP

(57) ABSTRACT

A system and method for reviewing documents are provided. A collection of documents is portioned into sets of documents for review by a plurality of reviewers. For each set, documents in the set are displayed on a display device for review by a reviewer and temporarily organized through grouping and sorting. The reviewer's labels for the displayed documents are received. Based on the reviewer's labels, a class from a plurality of classes is assigned to each of the reviewed documents. A classifier model stored in computer memory is progressively trained, based on features extracted from the reviewed documents in the set and their assigned classes. Prior to review of all documents in the set, a calculated subset of documents for which the classifier model assigns a class different from the one assigned based on the reviewer's label is returned for a second review by a reviewer. Models generated from one or more other document sets can be used to assess the review of a first of the sets.

23 Claims, 13 Drawing Sheets

OTHER PUBLICATIONS

Hofmann, Unsupervised Learning by Probabilistic Latent Semantic Analysis, *Machine Learning,* 42, 177-196, Kluwer Academic Publishers, 2001.

Ryall, et al., *Experiences with and Observations of Direct-Touch Tabletops,* In Tabletop '06: Proc. of the 1st *IEEE Intl. Workshop on Horizontal Interactive Human-Computer Systems,* pp. 89-96 (2006).

U.S. Appl. No. 12/080,414, filed Apr. 2, 2008, Lecerf.

U.S. Appl. No. 12/174,721, filed Jul. 17, 2008, Renders, et al.

U.S. Appl. No. 12/251,689, filed Oct. 15, 2008, Perronnin, et al.

U.S. Appl. No. 12/252,531, filed Oct. 16, 2008, Perronnin, et al.

U.S. Appl. No. 12/417,110, filed Apr. 2, 2009, Privault, et al.

U.S. Appl. No. 12/417,130, filed Apr. 2, 2009, Monet, et al.

BackStop LLP Software, http://backstopllp.com/software.html, downloaded May 26, 2009.

Gaussier, et al., A Hierarchial Model for Clustering and Categorising Documents, *In Advances in Information Retrieval—Proceedings of the 24th BCS-IRSG European Colloquium on IR Research (ECIR-02),* Mar. 25-27, 2002. Lecture Notes in Computer Science 2291, pp. 229-247, Springer.

H5 technologies: http://www.h5.com/about/index.html, downloaded Jun. 2, 2009.

Hofmann, Probabilistic Latent Semantic Analysis, In *Proc. of the 15th Conf. on Uncertainty in Artificial Intelligence,* pp. 289-296, Morgan Kaufmann 1999.

Joachims, Text Categorization with Support Vector Machines: Learning with Many Relevant Features, *Machine Learning: ECML-98. Proc. 10th European Conf. on Machine Learning,* pp. 137-142 (1998).

Lam, et al., Automatic Document Classification Based on Probabilistic Reasoning: Model and Performance Analysis, *Proc. IEEE Int'l Conf. on Systems, Man and Cybernetics,* vol. 3, pp. 2719-2723 (1997).

Li, et al., Classification of Text Documents, *Computer J.* 41(8), pp. 537-546 (1998) (Abstract).

Love, N., Automating Document Review, *CS224n Final Project,* Jun. 9, 2006.

Merkl, Text Classification with Self-Organizing Maps: Some Lessons Learned, *Neurocomputing,* vol. 21 (1-3), pp. 61-77, (1998) (Abstract).

Microsoft Surface™ (http://www.microsoft.com/surface/) downloaded May 21, 2009.

Multi-Touch $G^2$—Touch Screen from PQ Labs, California (see http://multi-touch-screen.net/) downloaded May 21, 2009.

Murphy, et al., Backstop: A Tool for Debugging Runtime Errors, *39th SIGCSE Technical Symposium on Computer Science Education,* pp. 173-177, Mar. 13, 2008.

O'Neill, et al., DISCO: Intelligent Help for Document Review, *DESI III Global E-Discovery/E-Disclosure Workshop: A Pre-Conference Workshop at the 12th Intl. Conf. on Artificial Intelligence and Law,* Jun. 8, 2009. (At http://www.law.pitt.edu/DESI3 Workshop/DESI III papers.html, Jun. 4, 2009.).

Xerox, *Text Categorization and Clustering, CategoriX & ClusteriXb,* May 2005, available at: http://www.xeroxtechnology.com/, downloaded May 26, 2009.

* cited by examiner

SYSTEM AND METHOD FOR ASSISTED DOCUMENT REVIEW

CROSS REFERENCE TO RELATED PATENTS AND APPLICATIONS

Cross reference is made to the following co-pending application, the disclosure of which is incorporated herein in its entirety, by reference:

U.S. application Ser. No. 12/417,130, filed Apr. 2, 2009, entitled APPARATUS AND METHOD FOR DOCUMENT COLLECTION AND FILTERING, by Nicolas Monet, et al.

BACKGROUND

The exemplary embodiment relates to document review and classification. It finds particular application in connection with the review of litigation documents and will be described with particular reference thereto. However, it is to be appreciated that it is also applicable to other supervised document review applications.

In the litigation context, large numbers of documents are often reviewed in the course of discovery. These documents may be in electronic form or, if not already in electronic form, may be scanned and then reviewed by legal counsel to identify responsive documents (documents which are responsive to a particular discovery request from an opposing party). Counsel may also review the responsive documents to identify privileged documents (documents for which a privilege can be asserted, such as the attorney client privilege or attorney work product privilege). These documents are flagged and are not initially provided to the opposing party.

Many computer-implemented tools have been developed to provide support for electronic discovery. Contextual review is an example: this technology uses the context within a document and/or between different documents to help reviewers determine the relevancy of the textual content. A very basic approach has also been to apply keyword search to databases of imaged data (e.g. tiff files) and text files. However this approach, even with advanced boolean rules and constraints, is known to have its limitations. (For example, important documents may not contain the selected keywords while many other documents of no interest may contain several. The search is sometimes improved by using "ontologies" or "word communities." An ontology can describe a particular industry-specific vocabulary by capturing information about the words and phrases that model a particular area of knowledge.

More effective approaches use statistical techniques to determine which documents are "similar" according to specified criteria (rule-based approach) or exemplars (machine learning approach) and to group them together.

Because of the large number of documents which may need to be reviewed in a litigation matter, a team of reviewers may be enlisted to review the documents. Each reviewer is provided with a set of the documents and reviews each of them on screen to determine whether the document is responsive/privileged or not. The process is subject to errors, in that some reviewers may not have the skills required to make a decision in all cases. Additionally, different reviewers may apply somewhat different standards of review. Further, even the most competent reviewers are prone to occasional accidental errors. Existing methods may provide for more than one reviewer to review each document. However, this adds to the cost and time required for completing the review process. Accordingly, a random sample of the documents may be subjected to a double review and if no errors or inconsistencies in the labeling are found, the rest of the documents are assumed to be correctly labeled.

Some tools for electronic discovery address the support of review coordinators with increased control over the review. However they are more focused on ensuring that the review is completed on time and within budget, than on providing means for automating the quality assessment and evaluating the reviewers results. These tools often provide information about how much of the collection has been reviewed, and how much remains to review. Review coordinators can then make adjustments regarding allocation of resources in order to complete the review within the time available. It is also possible to monitor the speed of individual reviewers, tracking how many documents each reviewer has processed. However with these tools, double review through sample checking is still needed for assessing the accuracy of the reviewers.

The work of the reviewers is generally monotonous, and this, when combined with often poor working conditions of the review teams, means that the work is likely to be highly error prone. However, people remain central to this work as there is not currently, nor in the foreseeable future, any technology which can understand the semantic content of documents fully, automatically and accurately. Unfortunately, the very reason that people are hired—their intelligence and ability to understand the semantic content of the documents and the contingencies of the legal case—is somewhat muted by the conditions in which they work and the technology that they use. Thus there is a need for a system that capitalizes on the intelligence of the reviewers while supporting their work with document content analysis capabilities and new interface technology, giving them more freedom and elements to organize their work and drive their annotation process.

INCORPORATION BY REFERENCE

The following references, the disclosures of which are incorporated herein in their entireties by reference, are mentioned:

U.S. Pub. No. 2003/0101187, published May 29, 2003, entitled METHODS, SYSTEMS, AND ARTICLES OF MANUFACTURE FOR SOFT HIERARCHICAL CLUSTERING OF CO-OCCURRING OBJECTS, by Eric Gaussier, et al., discloses a system for hierarchical topical clustering of text data based on statistical modeling of co-occurrences of (document, word) pairs.

U.S. Pat. No. 7,139,754, issued Nov. 21, 2006, entitled METHOD FOR MULTI-CLASS, MULTI-LABEL CATEGORIZATION USING PROBABILISTIC HIERARCHICAL MODELLING, by Cyril Goutte, et al., discloses a method for categorizing a set of objects, which includes defining a set of categories in which at least one category in the set is dependent on another category in the set, organizing the set of categories in a hierarchy that embodies any dependencies among the categories in the set, and for each object, assigning to the object one or more categories from the set of possible categories for which the object is relevant. A new set of labels is defined comprising all possible combinations of any number of the categories, such that if an object is relevant to several categories, the object is assigned the unique label corresponding to that subset of all relevant categories.

U.S. Pat. No. 7,457,808, issued Nov. 25, 2008, entitled METHOD AND APPARATUS FOR EXPLAINING CATEGORIZATION DECISIONS, by Cyril Goutte, et al., discloses a method and an apparatus in which feature selection is used to determine feature influence for a given categorization decision to identify those features in a categorized document that were important in classifying the document into one or more classes.

U.S. Pub. No. 2007/0005340, published Jan. 4, 2007, entitled INCREMENTAL TRAINING FOR PROBABILISTIC CATEGORIZER, by Cyril Goutte, et al., discloses a probabilistic document categorizer which has an associated vocabulary of words and an associated plurality of probabilistic categorizer parameters derived from a collection of documents. When a new document is received, the parameters are updated to reflect addition of the new document to the collection of documents based on vocabulary words contained in the new document, a category of the new document, and a collection size parameter indicative of an effective total number of instances of vocabulary words in the collection of documents.

U.S. Pub. No. 2007/0005639, published Jan. 4, 2007, entitled CATEGORIZATION INCLUDING DEPENDENCIES BETWEEN DIFFERENT CATEGORY SYSTEMS, by Eric Gaussier, et al., discloses a method for categorizing an object respective to at least two categorization dimensions, each categorization dimension being defined by a plurality of categories. A probability value indicative of the object for each category of each categorization dimension is determined and a categorization label is selected for the object respective to each categorization dimension based on (i) the determined probability values of the categories of that categorization dimension and (ii) the determined probability values of categories of at least one other of the at least two categorization dimensions.

U.S. Pub. No. 2007/0143101, published Jun. 21, 2007, entitled CLASS DESCRIPTION GENERATION FOR CLUSTERING AND CATEGORIZATION, by Cyril Goutte, discloses a method for characterizing a class of a probabilistic classifier or clustering system that includes probabilistic model parameters. For each of a plurality of candidate words or word combinations, divergence of the class from other classes is computed, based on one or more probabilistic model parameters profiling the candidate word or word combination. One or more words or word combinations is selected for characterizing the class as those candidate words or word combinations for which the class has substantial computed divergence from the other classes.

U.S. Pub. No. 2007/0239745, published Oct. 11, 2007, entitled HIERARCHICAL CLUSTERING WITH REAL-TIME UPDATING, by Agnes Guerraz, et al., discloses a probabilistic clustering system which is defined at least in part by probabilistic model parameters indicative of word counts, ratios, or frequencies characterizing classes of the clustering system. An association of one or more documents in the probabilistic clustering system is changed from one or more source classes to one or more destination classes. Probabilistic model parameters characterizing classes affected by the changed association are locally updated without updating probabilistic model parameters characterizing classes not affected by the changed association.

U.S. Pub. No. 2008/0249999, published Oct. 9, 2008, entitled INTERACTIVE CLEANING FOR AUTOMATIC DOCUMENT CLUSTERING AND CATEGORIZATION, and U.S. application Ser. No. 12/174,721, filed Jul. 17, 2008, entitled CALIBRATING AN AUTOMATIC DOCUMENT CATEGORIZER, both by Jean-Michel Renders, et al., relate to automatic document categorization methods.

U.S. application Ser. No. 12/417,110, filed on Apr. 2, 2009, entitled PRINTER IMAGE LOG SYSTEM FOR DOCUMENT GATHERING AND RETENTION, by Caroline Privault, et al. and U.S. application Ser. No. 12/417,130, filed on Apr. 2, 2009, entitled APPARATUS AND METHOD FOR DOCUMENT COLLECTION AND FILTERING, by Nicolas Monet, et al. disclose systems and methods for automatically storing and processing documents in a litigation context.

U.S. Pub. No. 2007/0150801, entitled INTERACTIVE LEARNING-BASED DOCUMENT ANNOTATION, by Boris Chidlovskii, et al., discloses a document annotation system which includes a graphical user interface that is used by an annotator to annotate documents. An active learning component trains an annotation model and proposes annotations to documents based on the annotation model.

U.S. Pub. No. 2008/0147574, published Jun. 19, 2008, entitled ACTIVE LEARNING METHODS FOR EVOLVING A CLASSIFIER, by Boris Chidlovskii, discloses a method for classifying data items such as a document based upon identification of element instances within the data item. A training set of classes is provided where each class is associated with one or more features indicative of accurate identification of an element instance within the data item. Upon the identification of the data item with the training set, a confidence factor is computed that the selected element instance is accurately identified. When a selected element instance has a low confidence factor, the associated features for the predicted class are changed by an annotator/expert so that the changed class definition of the new associated feature provides a higher confidence factor of accurate identification of element instances within the data item.

U.S. application Ser. No. 12/080,414, filed Apr. 2, 2008, entitled MODEL UNCERTAINTY VISUALIZATION FOR ACTIVE LEARNING, by Loïc Lecerf, discloses an active learning system including a representation module which generates a visual representation of a set of unlabeled elements. The representation shows the unlabeled elements as data points in a space and shows each of a plurality of classes as a class point in the space.

The following relate generally to search engines operating in the context of a database: U.S. Pat. Nos. 6,493,711; 6,708,165; 7,433,883; and U.S. Pub. Nos. 2003/0084040 and 2004/0177088.

BRIEF DESCRIPTION

In accordance with one aspect of the exemplary embodiment, a method of reviewing documents includes partitioning a collection of documents into sets of documents for review by a plurality of reviewers. For each set, the method includes displaying documents in the set on a display device for review by a reviewer, receiving the reviewer's labels for the displayed documents, based on the reviewer's labels, assigning a class from a plurality of classes to each of the reviewed documents, and progressively training a classifier model stored in computer memory based on features extracted from the reviewed documents in the set and their assigned classes. Prior to review of all documents in the set, documents from the set for which the classifier model assigns a class different from the one assigned based on the reviewer's label are identified and a subset of the identified documents is returned for a second review by the reviewer.

In another aspect, a document reviewing system includes memory which stores a set of documents for review, a display which displays documents in the set. A user input device receives information for determining class labels applied to the documents by a reviewer. A classifier model stored in computer readable memory is progressively trained based on the applied class labels. A document reviewing application stored in memory, prior to all documents in the set being labeled, compares a class assigned by the classifier for a labeled document to the label applied by the reviewer and identifies labeled documents for which the class label applied by the reviewer does not match the class assigned by the reviewer and returns a subset of the identified labeled documents for a second review.

In another aspect, a method of reviewing documents includes partitioning a collection of documents into sets of documents. For a first of the sets of documents, a first classifier model is generated, based on reviewer-applied labels for documents in the first set. For a second of the sets of documents, a second classifier model is generated, based on reviewer-applied labels for documents in the second set. A quality of the labels applied to the first set of documents is assessed including assigning classes to the documents from the first set of documents with the second classifier model and comparing the reviewer-applied labels of the documents in the first set with the classes assigned by the second classifier model to identify documents for which the reviewer-applied labels do not match the assigned classes.

DETAILED DESCRIPTION

Aspects of the exemplary embodiment relate to a system and method for assisting human reviewers in the classification of a large set of documents. The exemplary system and method are described in the context of classification of litigation documents for responding to discovery requests, however, other document classification systems which rely on user input are also contemplated. The exemplary system assists human reviews of large collections of documents by dynamically organizing a set of documents for user review.

The reviewing application is suited to assisting lawyers and paralegal teams in the review phase of an electronic discovery (eDiscovery) process. It combines machine learning technologies and advanced multi-touch interfaces to facilitate the work of the review teams and enables collaborative work.

Because review strategies may vary depending on objectives of the review together with time, resources, cost and risk considerations, the reviewing application can be designed to operate at different levels of the review process.

In one embodiment, a method of reviewing documents includes organizing a set of documents assigned to a reviewer, prior to the review or at intermediate stages of the review. The organization of the document set can be achieved though document clustering: in this case the documents may be grouped into a user-defined number of clusters. The organization of the document set can alternatively be achieved though document categorization, if a classifier model is available (e.g., one developed iteratively as the method proceeds or one developed prior to the beginning of the review). In this case, the documents may be grouped into two different piles, one pile containing the "possibly Responsive" documents according to the classifier model, and the other pile containing the "possibly Non-Responsive" documents according to the classifier model. In addition, documents within each pile can be further sorted to put first the documents that are either most likely Responsive (wrt. the classifier), or most likely Non-Responsive (wrt. the classifier).

As used herein, a document can be a text document, an image, or a combination thereof in electronic form and may represent one or more pages. Exemplary documents include memos, emails, reports, records, accounts, or the like, and can be in any computer readable format, such as Plaintext, HTML, Microsoft Office, PDF, JPG, TIFF files, XML files, spreadsheets, or the like. The document may be converted to a suitable format for processing. For example, optical character recognition (OCR) may be performed to extract text content of documents which are not already in a text format.

Figure 1:
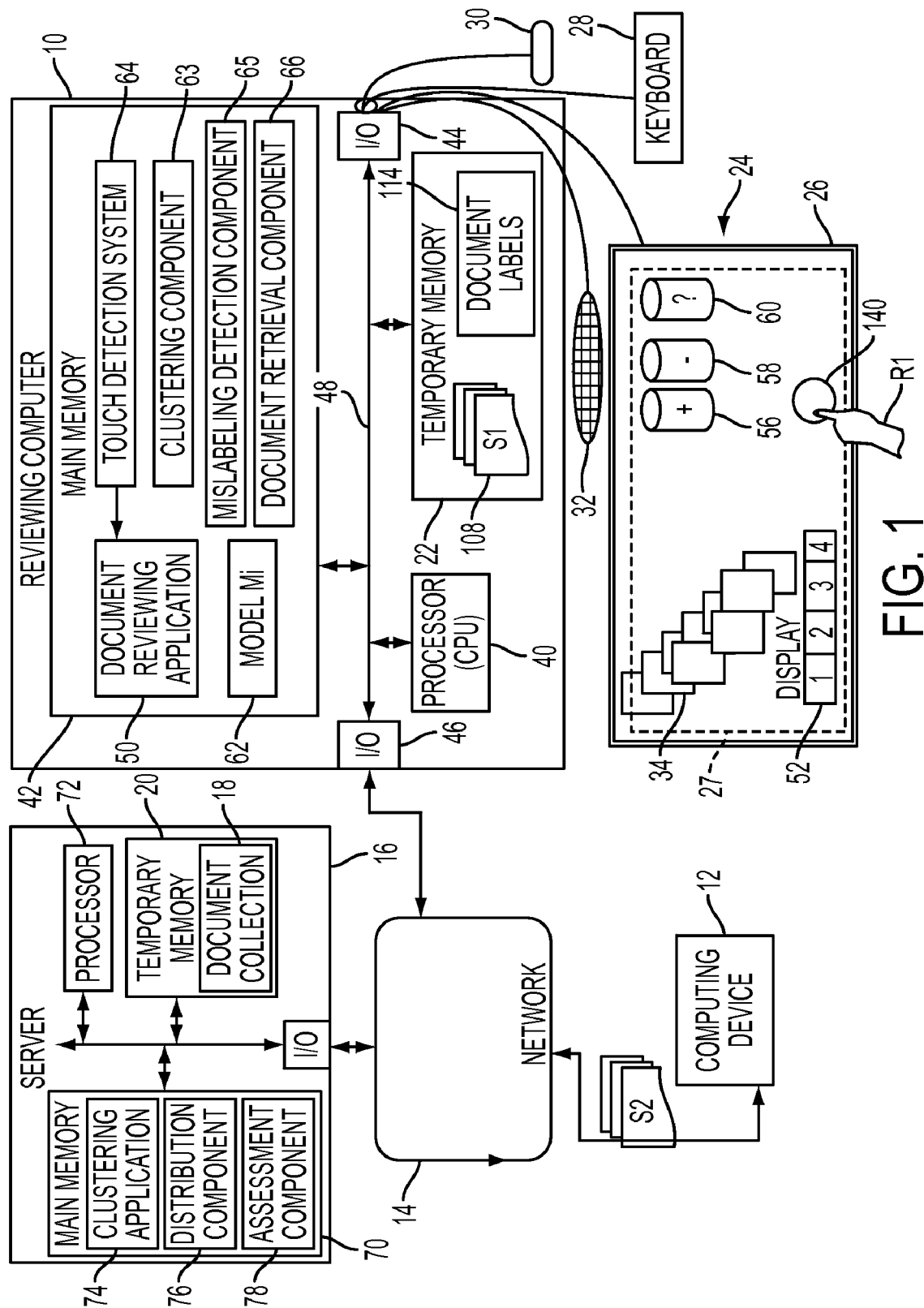
FIG. 1 is a functional block diagram of an exemplary document reviewing system in accordance with one aspect of the exemplary embodiment.

FIG. 1 illustrates an exemplary reviewing system. A plurality of reviewers R1, R2, R3, etc. may review documents on respective computing devices 10, 12, etc, such as personal computers, laptops, PDA's, touch screen tables, and the like. Since the computing devices 10, 12, may be similarly configured, only device 10 will be described in detail. The computing devices may be connected by a network 14, such as a wired or wireless network, to a master computer 16, here illustrated as a server computer. A large collection of documents 18 stored in temporary memory 20 on the server 16 may be partitioned into sets S1, S2, S3, etc. by the server and the sets distributed, one set of documents to each of the reviewers' computing devices 10, 12, etc. The documents to be reviewed by each reviewer may be distributed from the server computer to the computing devices 10, 12, and stored in respective temporary memory 22. Alternatively, the documents may remain on the server 16 and be accessed via a web browser or the like.

Each computing device 10, 12, etc. includes a user interface 24, such as a graphical user interface (GUI) or tactile user interface (TUI) which facilitates reviewing and manipulating documents by the reviewer. The user interface includes a display device 26, such as an LCD or plasma screen, computer monitor, or the like, which may be capable of displaying in color. A user input device, such as a touch-screen 27, keyboard 28, cursor control device 30, microphone 32, or combination thereof allows a user to manipulate graphical objects 34 (as representations of the underlying documents 20) on the display screen and open up the underlying documents 20 for review. The user interface receives information (touch signals, keyboard inputs, cursor selections, or the like) from which class labels applied to the documents by the reviewer are determined. The exemplary touch screen 27 includes multiple actuable areas which are independently reactive to touch with a finger or other tangible object or close proximity of an object (all of which are referred to herein for convenience as touch-sensitive). The touch screen 27 overlies or is integral with the screen of the display device 26. Exemplary touch-screen devices which may be utilized herein include the Multi-Touch $G^2$-Touch Screen from PQ Labs, California (see http://multi-touch-screen.net) and Microsoft Surface™ touch-screen table (http://www.microsoft.com/surface/). Signals, such as electrical signals, representative of the areas touched by the reviewer corresponding to class labels and/or other information, are output by the interface 24.

The computing device 10 includes a processor 40 in communication with a main memory 42, which stores computer program instructions for operating the computing device 10, for implementing at least a part of the exemplary method described below with reference to FIGS. 2 and 3, and for receiving user inputs from the GUI or TUI via an input/output interface 44. Another interface 46, such as a modem, allows communication with the server 16 via the network 14 and receipt of documents in set S1.

The components 22, 40, 42, 44, 46 of the computing device 10 may communicate via a data/control bus 48. The server computer 16 may include a similar bus.

A document reviewing application (system) 50 is stored in memory 42 and includes software instructions executed by processor 40. In particular, the system 50 is configured for causing the display to display graphical objects 34 representing the documents to be reviewed, optionally a selector icon 52, for allowing the reviewer to select how many clusters the documents for review are partitioned into, icons 56, 58, for assigning the reviewed documents to one or more classes, such as responsive (+) and non-responsive (−), and an icon 60 for retrieving documents that the reviewing application 50 flags as questionable. Other icons may be provided for highlighting portions of documents, assigning labels to them, and the like. Icons may serve multiple purposes. For example, a single icon, such as the virtual magnet described below, may serve to select, move, open, and annotate (label) documents.

A label, as used herein, can be any form of annotation which is suited for associating a class (and/or other information from which a class can be automatically determined) with the document. Exemplary labels may include HTML tags, metadata information, information stored in a separate file which identifies the document to which the label is assigned, combinations thereof, and the like.

The memory 42 stores a classifier model (Mi=M1, M2, M3 . . . etc.) 62, which may be progressively developed by machine learning techniques using the reviewer's labels (e.g., classifications) of the documents and features (e.g., words and/or word frequencies) extracted from the documents as inputs. A variety of machine learning techniques have been developed for application to document classification. Examples of such classifiers include neural networks, support vector machines (see, Thorsten Joachims, "Text categorization with support vector machines: Learning with many relevant features," Machine Learning: ECML-98. Proc. 10th European Conf. on Machine Learning, p. 137-42 (1998)), genetic programming, Kohonen type self-organizing maps (see, D. Merkl, "Text classification with self-organizing maps: Some lessons learned," Neurocomputing Vol. 21 (1-3), p. 61-77, (1998)), hierarchical Bayesian clustering, Bayesian networks (see, Lam, et al., "Automatic document classification based on probabilistic reasoning: Model and performance analysis," Proc. IEEE Int'l Conf. on Systems, Man and Cybernetics, Vol. 3, p. 2719-2723 (1997)), and Naive Bayes classifiers (see Y. H. Li, et al., "Classification of text documents," Computer J. 41(8), p. 537-46, (1998)). The Naive Bayes method has proven its efficiency, in particular, when using a small set of labeled documents and in the semi-supervised learning, when the class information is learned from the labeled and unlabeled data.

The reviewing computer 10 may include additional software components such as a clustering component 63, which may be part of the document reviewing application 50, which partitions a subset of the documents into a plurality of clusters. In one embodiment, the clustering component may be an automated clustering/classification system such as that disclosed in above mentioned U.S. Pub. No. 2003/0101187 and/or U.S. Pat. No. 7,139,754. A touch detection system 64 receives touch signals from the display 26 and inputs them as values into the document reviewing application 50. A document mislabeling component 65 applies a heuristic for identifying possibly mislabeled documents. A document retrieval component 66, which may form a part of the reviewing application, retrieves the actual documents corresponding to the user's selections from memory 22 and causes them to be displayed on the display screen 26 for review.

The exemplary server 16 includes memory 70 which stores software instructions for performing certain parts of the exemplary method. A processor 72, in communication with memories 20 and 70, executes the instructions. Included among these instructions is a clustering application 74, for assigning documents in the collection 18 to a respective one of a set of clusters (e.g., one cluster for each reviewer). The server 70 also includes a distribution component 76 for distributing the sets S1, S2, S3, etc to the reviewers, and an assessment component 78, which automatically evaluates each of the reviewers' work by comparing the classes assigned to the documents in the reviewer's set of documents against a model 62 generated from another reviewer's assignments, as described in greater detail below. As will be appreciated, rather than being located on the server 16, components 74, 76, 78 may be located in memory 22, 42 on one or more of the reviewing computers 10, 12, etc.

The processors 40, 72 may be the respective computer's CPU or one or more processing devices, such as a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device(s), capable of implementing a finite state machine that is in turn capable of implementing the flowchart shown in FIGS. 2 and 3, can be used as the processor.

Computer-readable memories 20, 22, 42, 70, which may be combined or separate, may represent any type of computer readable medium such as random access memory (RAM), read only memory (ROM), magnetic disk or tape, optical disk, flash memory, or holographic memory. In one embodiment, the computer memory 22, 42 comprises a combination of random access memory and read only memory. In some embodiments, the processor 40 and memory 42 may be combined in a single chip.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Broadly, the reviewing method proceeds in the following iterative stages, which are described in greater detail below with reference to FIGS. 2 and 3:

Stage A': An initial stage where documents are presorted and distributed among a set of reviewers, which may take place on the server computer 16.

Stage A: A first reviewing stage, initiated by reviewing application 50, where documents to be reviewed by a reviewer are organized into groups, for example, sorted by clustering or a pre-existing classifier model Mi providing a particular organization of the documents still to be tagged. This stage provides a grouping of the documents. Further, it orders the documents within each group, putting forward the documents likely to be of most interest to the user. The grouping may come from unsupervised clustering. Or, it may come from a pre-classification against an existing model Mi, in which case the grouping is made up of K piles (e.g., for K=2, "possibly positive" documents vs. possibly "negative documents"). The document organization in Stage A is not permanent. Rather, it is continuously modified, based on the statistical learning from the user tagging (Stage C).

Stage B may include a second reviewing stage, which includes receiving user tagging input for grouped documents. This stage may be implemented by the reviewing application 50. In Stage B, the reviewer tagging provides a set of documents already tagged by the user. Each document is tagged with one of K classes. While in the exemplary embodiment, classification is binary (K=2, responsive/non-responsive), the user tagging is not restricted to a binary classification; it can be of any kind, e.g., it can be the Privilege/Non-Privilege classification or it can be a Responsive/Non-Responsive classification plus at the same time an extra Privilege/Non-Privilege classification of the documents tagged Responsive. Or it can be a classification scheme with more than two categories for "issues coding," if multiple classification is done at the same time. Another optional aspect of Stage B is the extra information that the user can attach to the document in addition to its classification label. The user can highlight some sections of the documents which motivated the assignment of the label. The user can also add a sticky tag with selection of one or more pre-defined labels, such as 'hot' (for "highly responsive"), 'key', 'confidential', etc.

Stage C: In this stage, a classifier model 62 based on user tagging input for single reviewer and extracted features of the documents reviewed is built. Stage C corresponds to the current statistical analysis of the user tagging from Stage B. It is employed for assessing the quality of the tagging and to provide feed-back for re-organizing Stage A. At Stage C, the classifier is trained from the tagging of Stage B to create a categorizer model. It provides the possibly inconsistently labeled documents within Stage B. It can also be used to identify some not-yet-reviewed documents from Stage A that are very close (similar) to the documents tagged in stage B, in order to present them first to the user in Stage A.

In the exemplary embodiment, similarity is achieved by using as a document signature, its scoring against the K categories modeled by the classifier. This may be achieved as follows: all not-yet-reviewed documents di still remaining from stage A are classified against the classifier model built from documents tj from stage C. A document di that achieves an equivalent probability scoring to a document tj against all the K categories of the classifier, (e.g., for a binary classifier with two classes, Responsive and Non-Responsive, the probability for di to be Responsive is equivalent to probability for a document tj to be Responsive; AND the probability for di to be Non-Responsive is equivalent to probability for a document tj to be Non-Responsive), is pre-selected for further comparison. To be considered equivalent, the two probability values differ by less than a threshold amount. For example, the absolute difference $\delta$ between the two probability values is computed, and if $\delta$ is less than a threshold value (e.g., $\delta < 0.1$, or $<1$), the probability values are considered equal. For example, if one probability score is 98% Responsive and the other is 97.5% Responsive, the difference, 0.5% indicates that these scores are considered equivalent when the threshold is 1. Not yet reviewed documents di for which there currently exists no tj from the set of labeled documents in stage C having the same probability score as di, receive a 0 similarity score in order to indicate that they are not similar to any of the already tagged (i.e., reviewed) documents.

Further comparison for a pre-selected di may include retrieving a word frequency vector representation $V_{di}$ of di, and a word frequency vector representation $V_{tj}$ of tj. Vdi and Vtj are by-products of the training of the classifier model and its application to the not-yet-reviewed documents. In one embodiment, the classifier model stores a dictionary D containing all the words (or tokens) that are known and used by the classifier for its computations. Then, $V_{di}$ and $V_{tj}$ are obtained simply by listing all (and only) the words of di (respectively tj), that are also in D, and counting their total number of occurrences in di (respectively tj).

In other embodiments, the vectors $V_{di}$ and $V_{tj}$ may comprise frequencies for only a predetermined set of keywords (words or multiword expressions) in the document. These keywords may be known to appear in the document collection and may be selected manually or automatically.

A comparison is made between the two vectors to determine a similarity measure. For example, this may include computing how many words with same number of occurrences (frequency) exist between di and tj. If the two vector representations are the same, di receives a score of 100% similarity. If only half of the content of the two vectors is similar, di receives a score of 50% similarity, and so forth. Based on these scores, the documents of stage A are resorted in their respective clusters (or classes), in order to put first the most likely similar documents and present them to the reviewer as next samples to annotate to pursue the annotation process.

Stage D: Refinement and Assessment. After Stage C, the model can be used to perform one or more of: (a) re-sort groups in Stage A; (b) suggest re-review of documents in Stage B; (c) change the grouping of Stage A into 2 piles "possibly positive" documents versus possibly "negative documents;" and (d) as part of multi-reviewer quality assessment in Stage E when all documents have been reviewed.

Stage E: Multi-reviewer quality assessment using a plurality of single-reviewer classifier models. Stage E may include the final modeling of all the user tagging. The trained model can be exported for future use, for instance quality assessment by the review coordinator. The quality checking may be two-fold. A first quality check includes a "self-assessment" of the reviewer's labels, e.g., by providing a list of possibly inconsistently labeled documents. This list may be a subset of those documents for which the class assigned by the classifier model does not match the reviewer-assigned class. This subset of mislabeled documents may be determined through a "mislabeling detection heuristic" such as described in above-mentioned U.S. Pub. No. 2008/0249999, the disclosure of which is incorporated herein in its entirety by reference. In particular, the mislabelling detection component includes a component for identifying possibly mislabeled documents as those documents that probabilistically or statistically fit into another class better than into the labeled class, and the better fitting class is suggested as a corrective class label.

In addition, the mislabelling detection component 65 may include an outlier measure calculator to calculate outlier measures for the documents indicative of how well each document fits into the model generated by the probabilistic classifier 62. A threshold level of compatibility with the model is established and documents which do not meet the threshold level of compatibility are classed as outliers. In some embodiments, the outlier measure calculator operates interactively in that a user can select the outlier threshold that is compared with the outlier measures to determine which documents are deemed to be outliers. An outlier thresholder or other outlier identification algorithm may output outlier document identifications that are displayed or otherwise indicated to the user via the TUI interface 24.

A second quality check is a cross-validation with other user models, which may be performed on the server computer by the assessment component 78, implemented by processor 72. For example, in the cross validation, model M1 of set S1 of documents issued from reviewer R1's tagging, is applied to categorize set S2 of documents issued from user R2 tagging. Documents for which the tagging of S2 is inconsistent with the tagging predicted by M1 are filtered out. In the same way documents S1 are processed by user model M2 and/or M3. In addition, documents that are frequently inconsistently labeled among different reviewers are flagged as "difficult documents" and culled out for a double review. Documents that are flagged as "outliers" by each model can also be collected and culled out for a double review. These outliers are generally atypical documents with respect to the overall collection.

The stages may be iterative in that the method can loop back to an earlier stage as the model becomes more refined.

Figure 2:
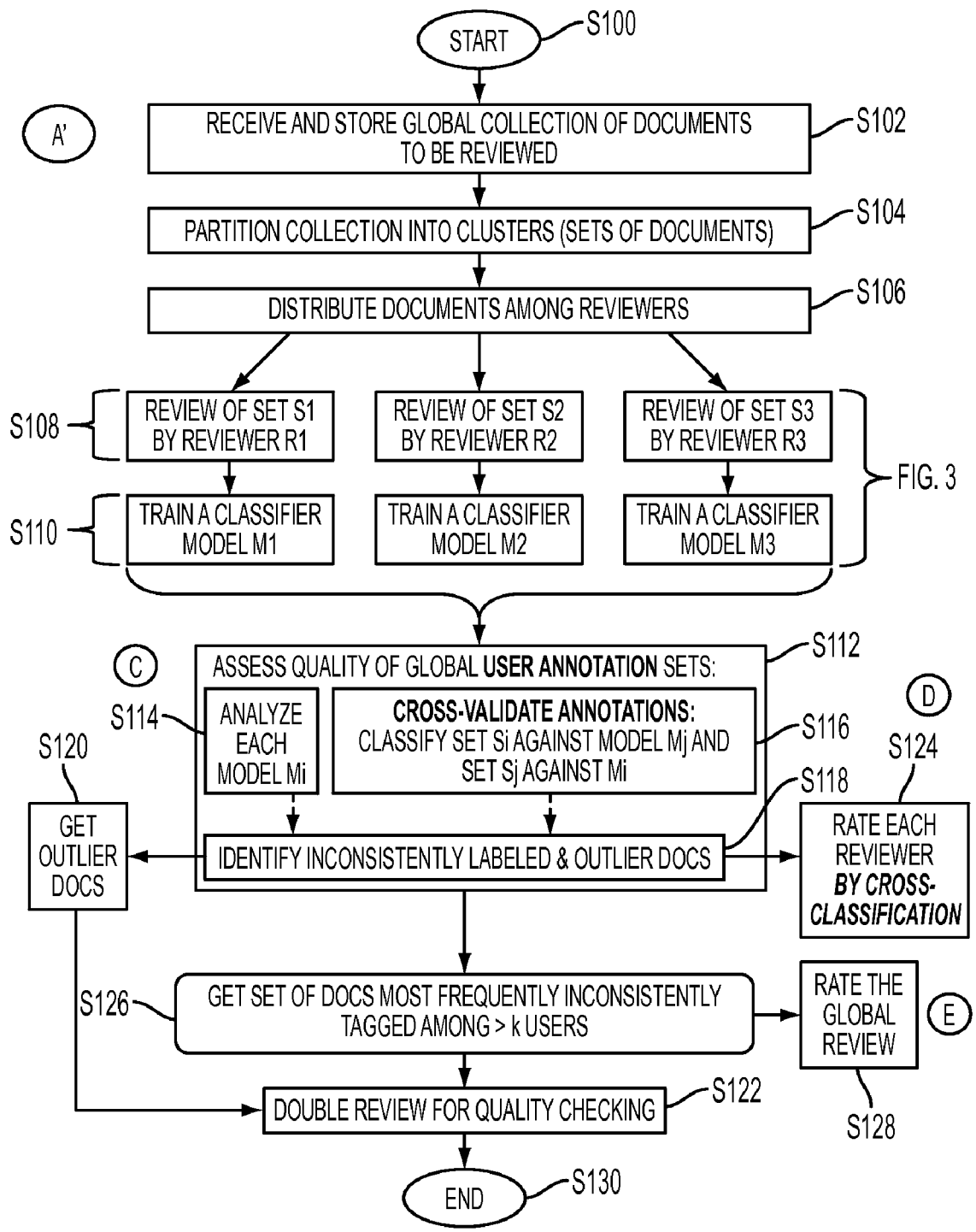
FIG. 2 illustrates steps of an exemplary document reviewing method, in accordance with another aspect of the exemplary embodiment.
Figure 3:
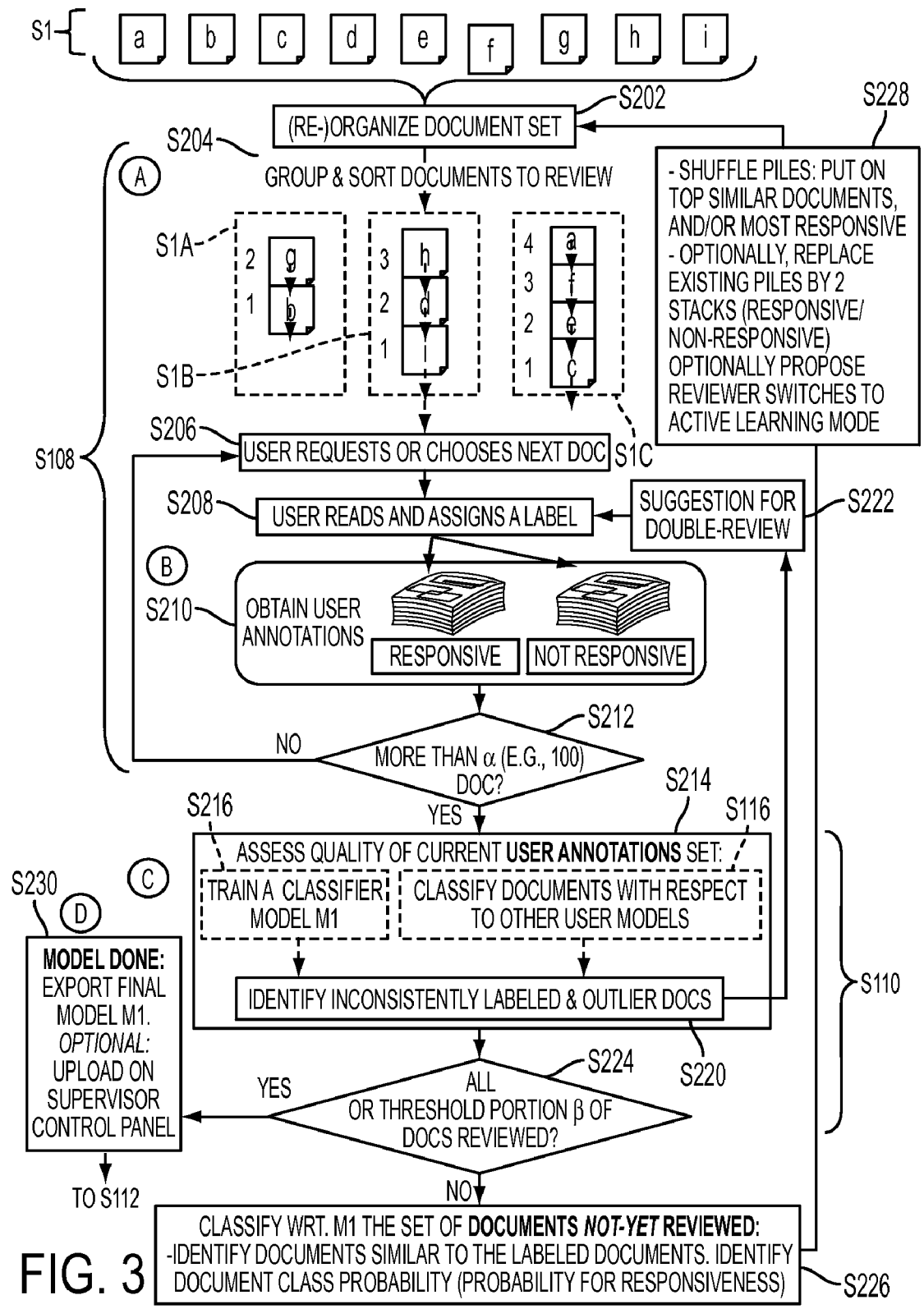
FIG. 3 illustrates aspects of the reviewing method of FIG. 2.

FIGS. 2 and 3 illustrate an exemplary reviewing method which may be performed in the environment of FIG. 1. FIG. 2 illustrates the overall process, while FIG. 3 illustrates aspects of the document review and initial modeling stages.

Referring first to FIG. 2, the method begins at S100 and may proceed in the following stages.

Initial Document Processing (Stage A'). This stage may include the following substeps:

At S102, a collection 18 of documents is received for review and stored in computer accessible memory 20. In the litigation context, these may be the documents of one party in litigation, which the party has supplied to litigation counsel as being potentially responsive to one or more discovery requests from an opposing party. Frequently, the received documents 18 are unorganized and are heterogeneous in the sense that they may comprise a variety of documents, such as emails, written correspondence, memos, meeting notes, photographs, drawings, plans, company product literature, client lists, bills, product designs, documents generated or copied by employees, and so forth.

At S104, the received documents in the collection 18 may undergo some initial grouping, for example, by using automated clustering techniques or a pre-existing classifier model, which may have been trained on different documents to those being examined in the review. For example, the document collection may undergo unsupervised or semi-supervised clustering into sub-sets of documents of similar topics. Clustering techniques are described for example in above-mentioned U.S. Pub. No. 20030101187 for text data based on statistical modeling of co-occurrences of (document, word) pairs. One commercially available example of an unsupervised clustering system is Xerox's CategoriX/ClusteriX™ technology. Unlike classification methods, unsupervised clustering methods do not start with a set of predefined classes, based on occurrence of predefined document attributes. Rather, given a set of documents, the clustering component 74 (which may apply the same clustering methodology as clustering component 63 and/or be the same component) may be instructed to assign each of the documents into one of a predefined number of clusters. Through one or more iterations, the clustering algorithm identifies similarities among documents and groups them into the clusters. Other methods for identifying similar documents for forming clusters which does not require identifying words, are disclosed, for example, in U.S. Pub. Nos. 2007/0258648 and 2008/0069456 to Perronnin, U.S. application Ser. No. 12/252,531, filed on Oct. 16, 2008, entitled MODELING IMAGES AS MIXTURES OF IMAGE MODELS, by Perronnin, et al. and U.S. application Ser. No. 12/251,689, filed on Oct. 15, 2008, entitled REPRESENTING DOCUMENTS WITH RUNLENGTH HISTOGRAMS, by Perronnin, et al., the disclosures of which are incorporated herein in their entireties by reference.

The clustering step may be performed in a single run. However, for large document collections, this could prove intractable. If the size of the collection is too large to perform the clustering in a whole batch, the clustering application 74 can either perform the clustering on a subset and then classify the remaining documents against the different clusters, or it can use prior knowledge through semi-supervised learning from specific samples of documents to create clusters on a subset of the collection, (and then again classify the remaining documents against the obtained cluster set). In the case of clustering on a subpart of the collection, the sub-part may be divided into N clusters of documents (for a team of N reviewers). Then, bulk-classification may be applied to the rest of the collection, in order to route every document to a cluster (S1, S2, S3, etc). If a cluster is too large it can be split a posteriori. If the review coordinator has some prior knowledge of which documents are responsive, a sample of responsive documents can be input to the clustering application 74. The clustering stage can then be semi-supervised by pre-assigning some responsive documents to some empty clusters.

In yet other embodiments, the review coordinator may assign documents randomly to the reviewers or by some other method, such as assigning all documents from one custodian (the person from whom the documents are obtained) to a single reviewer or group of reviewers, or by using a classifier to perform the assignment.

At S106, the received and optionally sorted documents are distributed to a plurality of reviewers. For example, in a first level review for responsiveness, reviewers are each assigned a pile of untagged documents to be labeled as Responsive or Non-Responsive. In the exemplary embodiment, three reviewers R1, R2, and R3, each with a respective reviewing device 10, such as a computer with a display, receives a subset S1, S2, S3, respectively, of the documents 18. In one embodiment, R1 (and similarly R2, R3, etc.) may be a group of two or more reviewers, each reviewing the same document set S1.

At S108, the reviewers review their respective subsets and their annotations (labels) are received by the reviewing application 50. For example, the reviewer may highlight portions of the document to indicate the relevant portions for later review and to provide a basis for a second reviewer to evaluate thee reviewer's reasons for the label applied. Highlighting can also be used to associate to each document a summary version of its content, specifically, exactly the portion or portions of text highlighted by the user, such as a string of five or more words (tokens). A separate classifier can be derived by training the classifier model on the summary versions of the labeled documents. This additional classifier can be used jointly with a full-content based classifier M1, M2, etc., concurrently with it, or as the classifier model itself.

At S110, a classifier model M1, M2, M3, . . . Mi 62 is learned for each reviewer/subset reviewed. Steps S108 and S110 are described in further detail below with reference to FIG. 3. Each classifier model M1, M2, M3, . . . Mi built for a respective user from the set of documents labeled by this user can be used for result tracking (Stage C). Each such model can provide feed-back information by identifying outlier (i.e., atypical) documents and possibly mislabeled documents.

At S112, the overall quality of the reviewing process is assessed. This step may include using each model Mi to self-assess the respective reviewer Ri (S114) and a cross validation step (S116). A percentage (wrt. each Si) of possibly mislabeled documents, i.e., inconsistently labeled with the global set of user annotations, can be determined to help rating a user annotation result.

In the cross validation step (S116), for each subset reviewed, the documents are automatically classified with a model developed on another subset. Thus, for example, subset S1, which was reviewed by reviewer R1, may be classified with the model M2 trained on the labels of S2, which were provided by reviewer R2. Similarly, subset S2, which was reviewed by R2 is classified with the model M3, which was trained on the labels of S3 by R3. Finally, subset S3, reviewed by R3, is classified with the model M1, trained on the labels of S1 provided by R1. As will be appreciated, the review process maybe extended to have document subsets classified by more than one classifier, in which case, subset S1 may be classified by M2 and M3.

The classification labels assigned to the documents by the classifiers M1, M2, M3, . . . Mi are compared with those provided by the original reviewers R1, R2, R3, . . . Ri, respectively.

Documents for which the model classifier or classifiers give different or inconsistent classes when compared with those of the original reviewer are extracted (S118). Outlier documents can be selected from this group of documents (S120) and given a second review (S122), e.g., by the review coordinator alone and/or other reviewer(s). Additionally, each reviewer may be rated based on how consistent the labels applied by the reviewer are with the outputs of the classifiers (S124). The cross-validation steps help to ensure quality control and consistency between the different reviewers. The set of documents which are inconsistently labeled across the review team models can be extracted. These documents can be selected for a second level of review.

At S126, a set of documents most inconsistently labeled in the cross validation step is obtained These documents may be used in a global rating of the review process (S128). They may also be subject to a double review at S122. The method ends at S130.

With reference now to FIG. 3, the steps in an individual reviewer's review process are illustrated. The steps for reviewer R1 are shown, with the understanding that the same process may be followed for each reviewer R1, R2, R3, etc.

S108 (Stages A and B) may include the following substeps. The subset of documents (S1 in the illustrated embodiment) received by reviewer R1 at S106 is organized by clustering the documents (by clustering component 63) into a set of piles S1A, S1B, and S1C (S202). Alternatively, a classifier trained on a set of similar documents may be used to partition the subset into K groups. Such a reference classification model may be trained from the labels of a senior attorney or review coordinator who is familiar with the case and/or documents to be reviewed. The labels of such a person may thus help in guiding the review team in future labeling.

The clustering process (or classification) may be performed similarly to that described for S104, but here it is on a subset of the document collection. Since the number of documents is much smaller than in the whole collection, the clustering may proceed in a single process, (without the need for bulk classification as in S104). In this step, the reviewer may be permitted to select the number of clusters. Three piles are shown in the illustrated embodiment, but any number of clusters may be selected. At a later stage, a trained classifier M1 trained on labeled documents from the set S1 may be used to arrange the set S1 into K groups of documents (e.g., the possibly Responsive ones and the possibly Non-Responsive ones in the case of a binary classifier for responsiveness tagging, where K=2).

After clustering, the documents in each cluster that the reviewer is to review may then be automatically organized, with the most similar documents placed on top of a displayed document pile (S204). Similarity may be based, for example, on co-occurrence of key words in the documents, metadata, author, file type, file size, layout, or on extracted low level features, such a color, texture and the like, or a combination thereof. As discussed above, when the method has already looped at least once through stage C, the similarity measure computed there may be used in the organization of each cluster. Alternatively, if the grouping was obtained through a pre-classification model as described above, documents may be organized based on their probability of responsiveness as an output of the classifier.

At S206, the reviewer R1 begins to review the documents and label them with class labels. At this stage, the user may, at least initially, be permitted to choose freely in selecting documents from the different piles (clusters) in any order. In particular, a reviewer retrieves a document from one of the piles in his assigned subset, and the document is displayed on his display. The reviewer R1 reads the document and makes a decision and labels the document with a label 114 corresponding to an appropriate one of a plurality of predefined classes (S208). In the exemplary embodiment, the document is tagged as either "responsive" or "non-responsive," although it is to be appreciated that other or additional classes may be used. The user label(s) is received by the system 50 and stored in memory 22 (S210).

At S212, if the portion of documents reviewed is lower than a threshold amount α (e.g., lower than a certain number, such as about 100, or less than a minimum percentage of the documents, such as less than 1% or 5%), which may be a tunable parameter, the method returns to S206, otherwise, the method proceeds to S110.

S110, the development of a single reviewer classifier Mi, may include the following substeps:

A respective classifier model Mi is trained based on the user tagging input for each single reviewer (S216). In the exemplary embodiment, three models M1, M2, M3 are trained, one for each reviewer (or subset reviewed). Thus, in the exemplary embodiment, each model Mi is trained only on the document labels assigned for those documents in the subset reviewed and not on the labels assigned by the other reviewers to other document sets. At an early stage of the review process, the classifier model Mi has been trained on a relatively few documents and does not have the discriminative power that it may achieve when input with the labels applied to hundreds, or thousands of documents. The classifier model Mi may still be useful, however, in identifying inconsistently labeled and outlier documents (by comparing the user applied labels with those output by the partially trained classifier and using a heuristic such as that described in U.S. Pub. No. 2008/0249999, which makes use of the document entropy level and the document ambiguity level to select a subset of these documents) (S220). These may be presented to the reviewer as a suggestion for another review (S222). In this way, the reviewer is able to correct his accidental mistakes which may otherwise impact the performance of the classifier and on the other hand, confirm the labels given to documents that the classifier sees as outliers and thus aid the classifier learning. Alternatively or additionally, the inconsistently labeled and outlier documents may be forwarded to a second reviewer to obtain a second opinion. The second reviewer may be unaware that these documents are undergoing second review and therefore reviews them in the normal way. In yet another embodiment, the inconsistently labeled and outlier documents may be sent to the review coordinator who may assemble several reviewers to discuss the labeling of these documents so that all reviewers may participate in and/or learn from the discussion. Corrections of the labeling can also be made in stage B in order to improve the model Mi and its further predictions on-the-fly.

At S224, if at least the predetermined minimum portion a of the documents has been reviewed, but less than threshold portion $\beta$ (e.g., $\beta$>1000 documents or all documents) of the documents has been reviewed, where $\beta$>$\alpha$, the progressively trained classifier M1 may be used to classify the documents in the subset which the reviewer has not yet reviewed and labeled (S226). Based on the classification, the documents remaining in piles S1A, S1B, S1C may be resorted into different groups (e.g., the documents are partitioned into a "possibly responsive" pile and a "possibly non-responsive" pile) (S228). In particular, at S228, the number of piles may be reduced based on the number of classes ultimately desired— two in the case of a responsive/non-responsive classification, three in the case of responsive-privileged/responsive-non privileged/non-responsive.

If the classifier M1 is a probabilistic classifier, the documents classed as most likely to be responsive may be placed at the top of the responsive pile and the documents most likely to be non-responsive are placed at the top of the non-responsive pile. The method returns to S202, where the documents are organized, and the user continues to review documents and the model M1 is progressively refined. Documents in the set may be reclassified by the model M1 as its discriminating capability is improved.

Once enough documents have been manually labeled by the user (e.g., after a predetermined amount $\gamma$ e.g., a number or percentage of the documents has been reviewed, where $\alpha$<$\gamma$<$\beta$), the partially trained classification model Mi is able to provide feedback information concerning similar documents, ambiguous documents, and possibly mislabeled documents. The user may be prompted to switch to an Active Learning mode. If the user decides to switch to the Active Learning mode to continue the review, this means that next documents are chosen automatically by the system 50 to be submitted to review by the user. The user simply requests the next document, and the system selects an appropriate one. In this way, the system may propose for next review, documents which would be helpful in training the classifier model, e.g., documents which the classifier is not able to assign to any one class with confidence. Additionally, or alternatively, the classifier may select for next review documents that are most similar to the ones reviewed by the user until now or documents that the classifier is able to assign to a class with confidence.

After the set of documents has been fully reviewed or a threshold fraction have been tagged by the reviewer or each reviewer in a group, the tagging input of each user in the group is used to complete the training of the classifier Mi based on each user's tagging of the documents in the subset. Once a threshold level $\beta$ (or all documents) has been reviewed at S224, the model is exported to the server computer (S230), where it may be uploaded onto the review coordinator's control panel. The output of the single classifier may also be used as part of multi-reviewer quality assessment in S112 (as illustrated in FIG. 2).

The method illustrated in FIGS. 2 and 3 may be implemented in a computer program product that may be executed on a computer (or by multiple computers). The computer program product may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and 3, can be used to implement the method.

Further details of the system and method will now be described.

In the litigation context, an objective of the reviewing process is to produce the responsive documents to the other party or investigating government agency within the time given to do so. However the way the review is conducted may vary widely depending on the type of matter. For example, in some cases an objective may be to make quick decisions on responsiveness and privilege. In other cases, the scope of the review is more focused on researching documents to assess the case, build fact patterns or identify documents for depositions. In this latter case, the reviewers may invest more time in evaluating and coding the documents.

The level of use of an automated system for labeling documents may be conditioned by how much the review team can rely on software technology to build the production set. If the risk of producing, by mistake, a privileged document is not too high, bulk classification tools can be a suitable approach to balance time, cost and risk while at the same time advanced user-interfaces may be of secondary importance. On the contrary, if the level of required accuracy is such that each document needs to be manually reviewed by an attorney or other qualified reviewer, the use of a classification methodology through an advanced user interface may be of primary importance.

As will be appreciated, the decisions on how the documents will be split up for review, deciding whether a review of each document by a single reviewer will be generally sufficient for each document or whether multiple reviews of each document should be provided to ensure full compliance, may be determined by the review coordinator, depending on the purpose of the review. In the case of a large or complex review, the review coordinator organizes the review which may include organizing the document collection into review sets and assigning the sets to the reviewers, deciding whether the review should entail a single-pass process, in which responsiveness, privilege and issue coding are reviewed jointly, or deciding whether a two stage review is more appropriate. In a two stage review, a first pass determines the responsiveness of the documents ("responsive" vs. "not-responsive"), and then the responsive documents undergo a second pass, where the classes may be "privileged" and "non-privileged." The review coordinator may also decide whether there should be second pass review of a reviewer's work by a second reviewer, such as by a supervising attorney to assess the accuracy of the review team or advanced checking for privileged documents.

The exemplary method and system are suitable to adaptation to each of these review approaches.

Mislabeling Detection Heuristic

As noted above, a mislabeling detection heuristic, such as that described in U.S. Pub. No. 2008/0249999, may be employed for identifying documents to be returned for a second review from among those whose reviewer-applied label does not match that assigned by the classifier model. An illustrative example of possible mislabeling identification is next described. In a suitable approach, the probabilistic model Mi is generated. Then, for each document d of the set of documents, the model is used to compute an estimated value of $P(c|d)$ (the result of the classification of d), an associated outlier measure, and an ambiguity measure for each document d. Outlier documents are atypical documents, or at least, are dissimilar from those the classifier has seen so far. The outlier measure is a value which represents the confidence the classifier has in assigning $P(c|d)$.

The mislabeling heuristic may be performed as outlined in U.S. Pub. No. 2008/0249999 using CE as set forth in Equation (6) or KL as set forth in Equation (7), and the ambiguity measure Ambi(d). The values of $P(c|d)$ are ranked along each class c by decreasing value. Then, defining c_label to be the index of the category label manually assigned to d and r_label its rank in the sorted $P(c|d)$ list, the following algorithm is applied by the possible mislabeling identifier. If the outlier thresholder indicates that document d is not an outlier document and if additionally the ambiguity thresholder indicates that (r_label−Ambi(d))>Ta where Ta is a selected threshold for ambiguity (such as Ta=0.5 which is suitable using the illustrative ambiguity measure formulation of Equation (9)), then the document d is considered to be likely to have been mislabeled, and the document d identification is included in the set of possibly mislabeled document identifications. In such a case, the alternative class $C1=\text{argmax}(P(c|d))$ is proposed to the user as an alternative category for correction. If the condition (r_label−Ambi(d))>Ta is not met, then the document d is deemed likely to have been labeled properly.

Thus, for each document d which has a label which does not match that provided by the classifier, an outlier measure of d is first computed. If it is under a given threshold T_outlierness, the document d is flagged as an outlier, and no determination is made as to whether the document is mislabeled or not. The document is not presented to the reviewer as a possibly mislabeled document. It can, however, be presented to the reviewer as an outlier document, i.e., an atypical document, which may be a signal to the reviewer that a more detailed review is warranted before the reviewer confirms or changes the assigned class label. If document d is not considered as an outlier, the level of ambiguity Ambi(d) of the document d is computed: this measure is indicative of a number of classes with which document d has similarity under the model Mi. For instance if it is 1, it means that d is not considered ambiguous at all. If it is K, (K being the total number of classes in the model), d is highly ambiguous. Then the classes c of the model are sorted along their probability of containing d (this is the output result of the classification of d through model Mi, namely the vector $P(c|d)$) and in this ranking r_label, the rank of the reviewer's label assigned to d is identified. The purpose of this analysis is to determine whether the reviewer or the classifier label is more reliable, and further, if the document ambiguity renders both labels equally plausible. The document will only be returned for second review if the classifier label is highly ranked and not too ambiguous. For determining this, the difference [r_label−Ambi(d)] is computed and if it is above a given threshold, e.g., 0.5, then document d is placed in the list of the mislabeled documents to be returned for second review.

Some examples of the result of this heuristic: For instance, if the user label comes 3rd in the classifier list, but the ambiguity level of d is up to 4 classes, then 3−4=−1<0.5=>d is not suspected as mislabeled. (Because d could be correctly assigned to 4 different classes of the categorizer, and if the user says something different from the classifier, he may not be necessarily wrong). If the user label comes only 2nd in the classifier list, but the ambiguity level of d is 1, (no ambiguity for the classifier on which class to assign d) then 2−1=1>0.5=>d is enlisted in the mislabeled docs returned to the user. If the user label comes 1st in the classifier list, and the ambiguity level of d is 1, then 1−1=0<0.5=>d is NOT considered mislabeled. If the user label comes 1st in the classifier list, and the ambiguity level of d is 2, then 1−2=−1<0.5=>d is NOT considered mislabeled, (although ambiguous, this is not relevant as the classifier and the user agree).

Second Level Review

Where there are multiple levels of review, the first level may involve a relatively quick decision by the reviewer on the responsiveness which may have been suggested through bulk classification. In a second level review, the reviewers may need to invest more time in evaluating and coding the documents. For example, the reviewer may research discovery documents to assess the case, build fact patterns, and/or identify documents for depositions or exhibits. The second level review may also include a review of responsive documents to identify privilege documents to be filtered out. The reviewers may need to spend time coding the documents, highlighting the contents, sharing their opinions, creating special sets of documents, etc.

The second level review process may proceed similarly to the first level. To launch the second level review process, a set of pre-classified responsive documents is loaded and initially organized through unsupervised clustering into sub-sets of documents of similar topics (as for S202). Each pile may be sorted to provide documents with higher probability of responsiveness first. The user, at least initially may be permitted to choose freely to draw documents from the different piles in any order. When a document is open, some sections can be highlighted, to indicate which sections are of particular interest for responsiveness or to build the case. Virtual "sticky notes" can be attached to the document, which indicate if it is highly-responsive for instance, or which suggest a choice within a set of predefined coding tags. Once enough documents have been manually reviewed by the user, a classification model is trained and feedback information is provided such as similar documents, ambiguous documents, possibly mislabeled documents as for S214.

Once a user categorizer model is in use, the user can decide to switch to the "Active Learning" mode to continue the review, which means that next documents are chosen automatically by the system to be submitted to review by the user.

Review Coordination

In case of large-scale reviews involving many reviewers, e.g., contract attorneys, associates and legal assistants from outside counsel, the reviewers may be under the supervision of a review coordinator. The role of the coordinator includes the organization of the documents into groups or folders which has a significant impact on review efficiency. The initial clustering and/or classification which helps in grouping documents together (for assigning them to the reviewers) according to their content, has advantages over conventional methods for distribution. Currently, documents are frequently organized by custodian (the person from whom the documents were obtained). One or more reviewer is assigned to review all the documents for a given custodian. The textual content classification/clustering used herein enables the coordinator to organize documents by topics, thus enabling the reviewers to make document decisions more efficiently and consistently. The coordinator's role is also to ensure some quality control and result tracking: having a model trained from each reviewer's labels provides some means to evaluate the global outcome of a review process.

The exemplary system and method provide advantages over existing systems in that the cost of the review process can be reduced without compromising its accuracy. The duration of the review can also be reduced by selecting for a second review, only those documents which are either helpful in training the classifier or which the classifier model suggest are wrongly classified. The accuracy of the review can in some cases be improved through online feed-back and continuous analysis of user annotations. In conventional review processes, manually reviewing mass quantities of documents without assistance of software tools increases the likelihood of errors and inconsistent coding in the review team. The method also provides a more accurate method for assessing the global result of a review. Conventionally, a random sample is selected for double review. In the present system, the models developed from the labels of different reviewers can provide the equivalent of a second pair of eyes. The method also provides a method for measuring the respective performance accuracy of each of the reviewers.

While the heart of the review process in the proposed system still remains the human annotator (reviewer) whose work is to read each document for deciding its class or relevancy (e.g., Responsive/Non-Responsive or Privilege/Non-Privilege), the system in which the reviewer operates facilitates and improves the review by: grouping documents in a useful way, e.g., partitioning by topics or likeliness for being responsive; sorting documents, instead of presenting them in a random order; analyzing the user annotation, to provide online feed-back on consistency at intermediate stages of the review; suggesting documents to review next, e.g., documents similar to the ones already reviewed or possibly inconsistently labeled; enabling cross-evaluation/validation, against other user labels.

Figure 4:
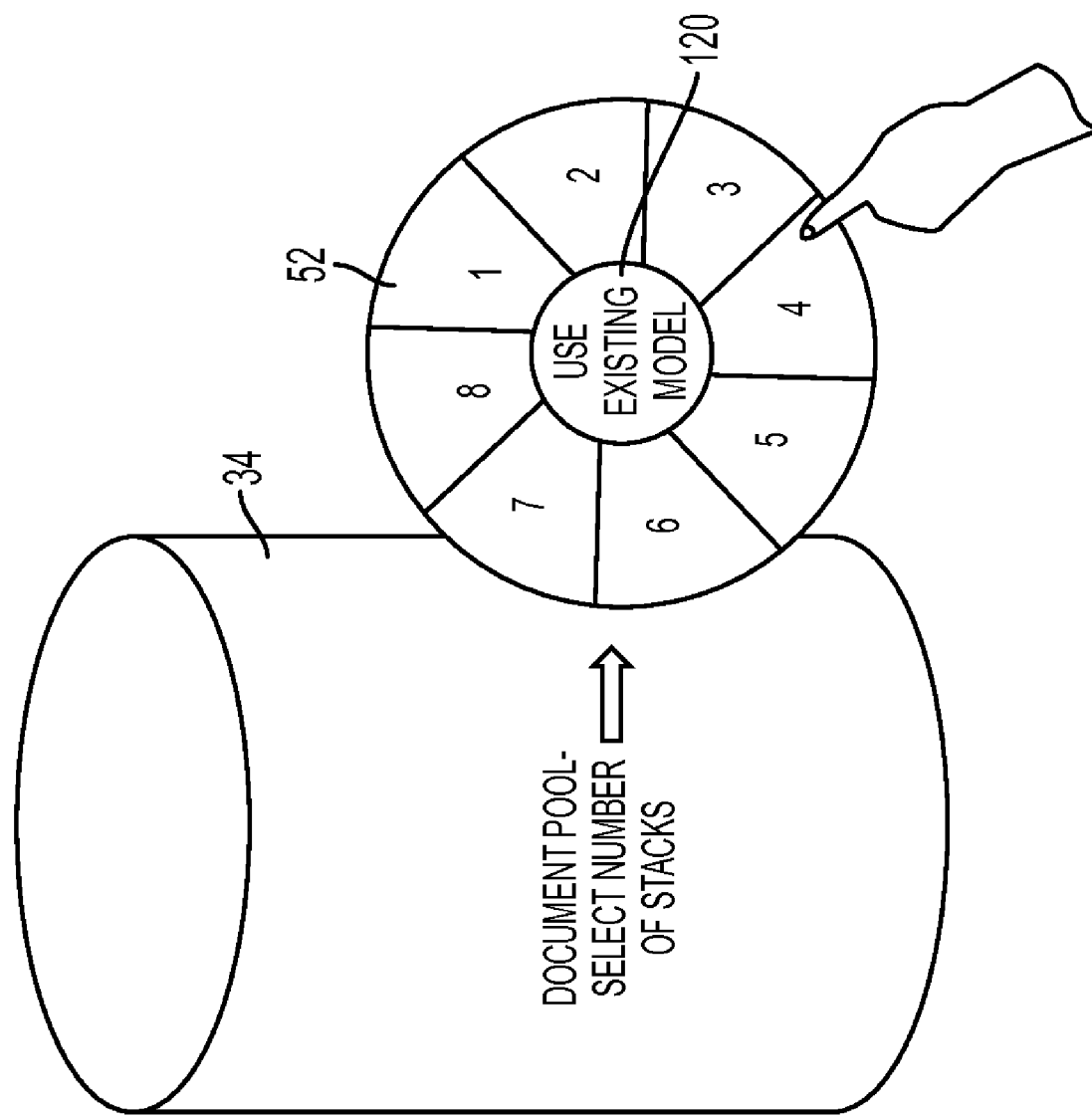
FIG. 4 is a screenshot illustrating selection, through user interaction, of a number of clusters to be used by a clustering model.

With reference now to FIGS. 4-7, one embodiment of an exemplary review interface 24 will now be described in the context of an exemplary review session. FIG. 4 shows a screenshot of the exemplary review interface at the start of the review process. The user launches the application. The system 50 loads in the background the (predefined) set of non-annotated documents to be reviewed and invites the user to choose the number of clusters into which the documents have to be organized. In the exemplary embodiment, a selector, such as wheel 52 is displayed with a number of touch-actuable regions, each corresponding to a different number of clusters. If a user finger-clicks on "4", the screen shown in FIG. 5 appears.

Aligned on screen, are graphic representations (piles, or other arrangements) 92, 94, 96, 98 of the four clusters. For example, the user can see at the upper left of the screen the four requested piles. The piles may graphically represent the relative or actual numbers of documents in the piles. For example, pile 98 is tallest and thus contains the greatest number of documents. Alternatively, the piles may be labeled with the number of documents that each contains. Displayed beside each pile may also be a respective set 100, 102, 104, 106 of associated keywords or other features which led to the documents being grouped into a particular cluster. Also displayed are decision stacks 56, 58, representing each of the classes into which the documents are to be assigned. For example, on the right of the screen appear two decision stacks: Responsive (with a '+' sign) and Non-Responsive (with a '−' sign) to be filled in by the user. In the middle, an icon 60 for "possibly mislabeled" documents is provided. At the start of the process this stack is empty.

Figure 6:
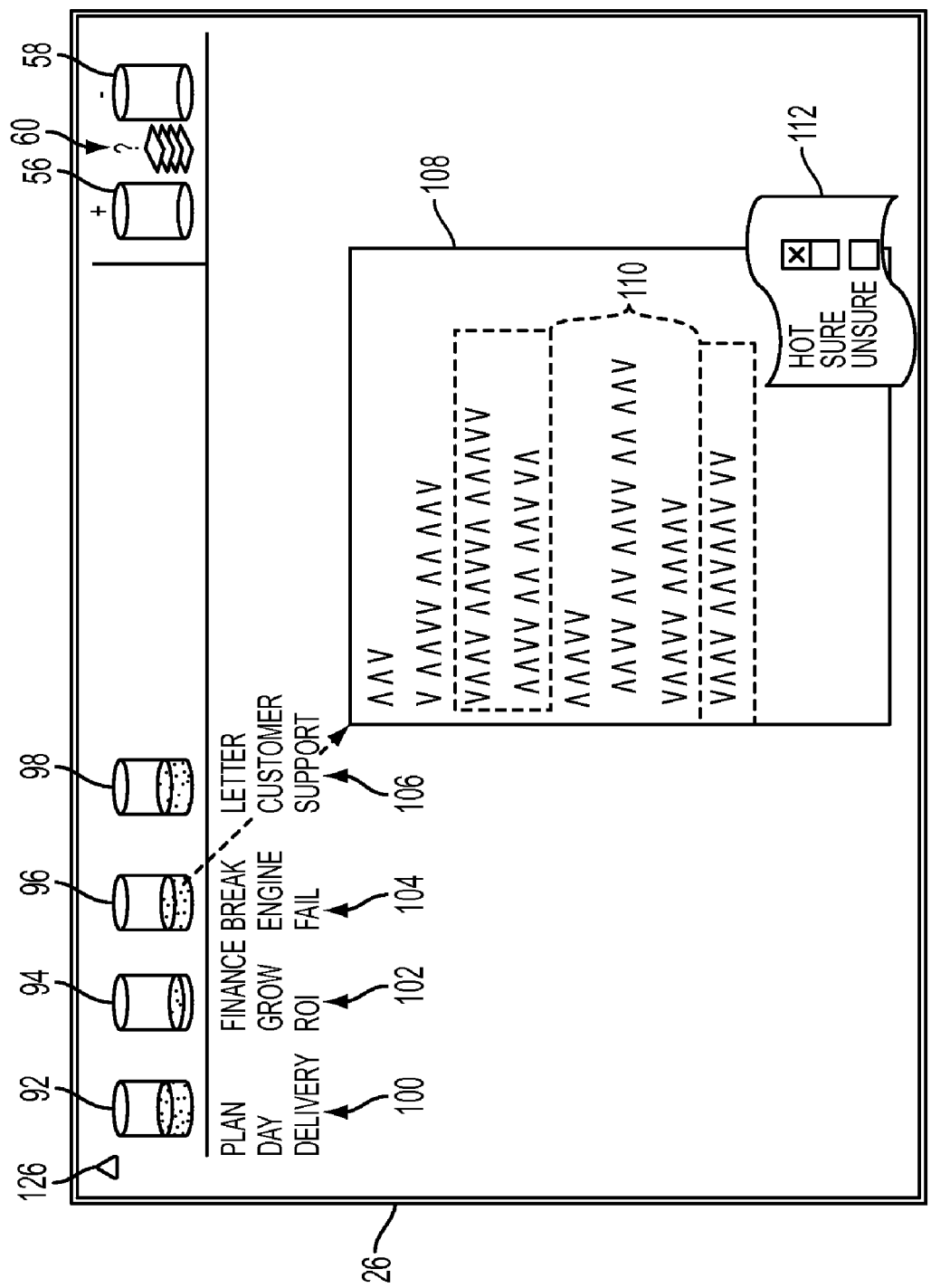
FIG. 6 is a screenshot illustrating a document drawn from one of the piles in the process of review.

Referring now to FIG. 6, the reviewer decides to draw the document on the top of the third pile 96 for review. The reviewer drags-and-drops a document 108 from the third pile 96 to the middle of the screen to open the top document. The document 108 is displayed with the text at a readable size. The reviewer highlights two phrases by running across them with a finger, as shown at 110, and selects the value "hot" for "highly responsive document" in the attached sticky note 112.

Figure 7:
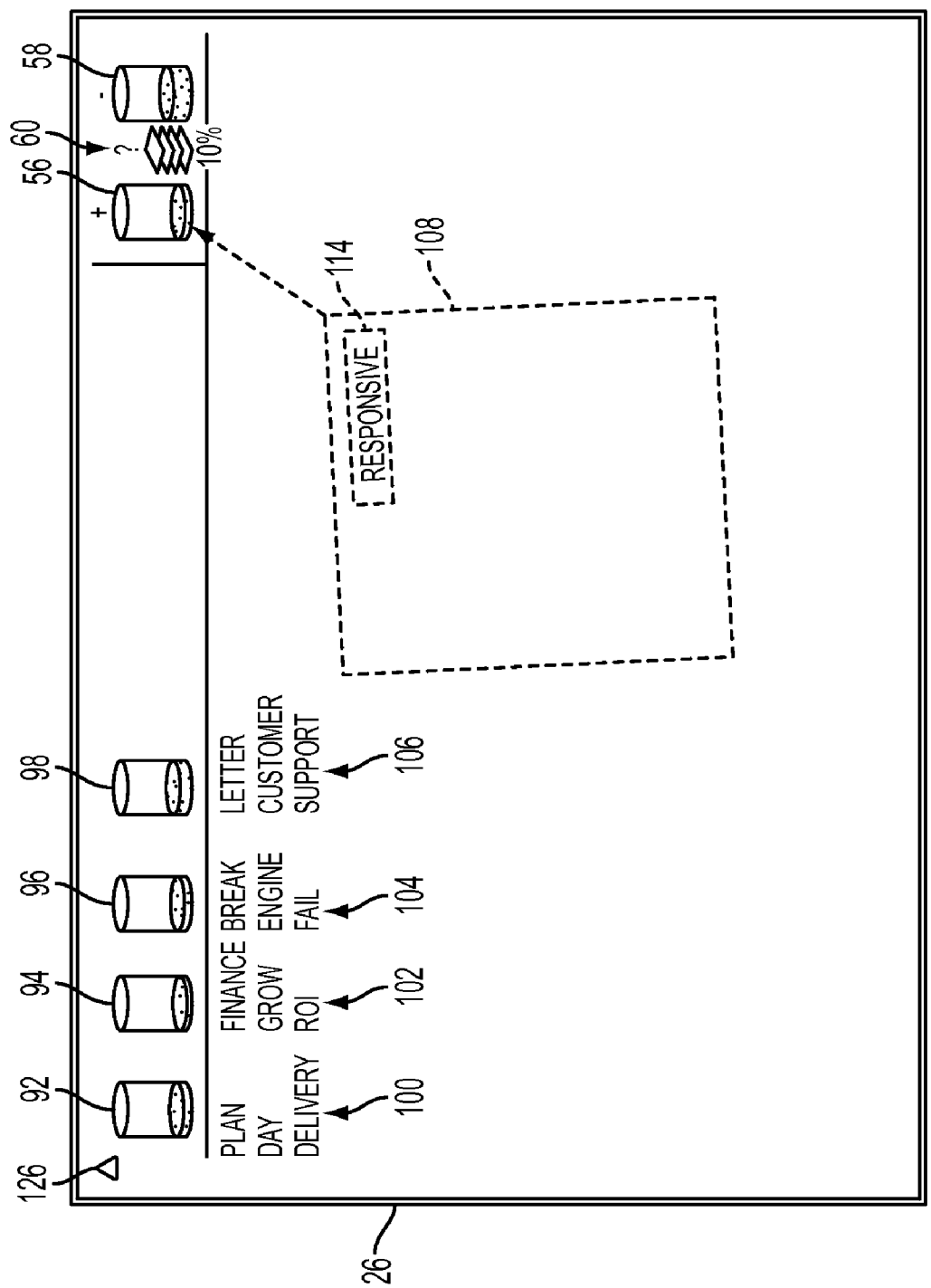
FIG. 7 illustrates assigning the documents to one of a plurality of classification stacks.

As shown in FIG. 7, the user decides to move the current document to the decision stack 56 for Responsive documents before opening and reading a new document. The document moved to the '+' decision stack is automatically tagged with a tag 114, such as an HTML tag, denoting it as Responsive, (or a list can be maintained as global plaintext file, where each document file name is written down followed by its tag name).

After about 100 more documents have been labeled in this way (this may be an application parameter threshold that can be tuned by an administrator to lower values such as 40 documents), the reviewing application 50 learns automatically, i.e., in the background, a classifier model 62, from all the user-applied labels recorded up to this stage and features of the documents. The reviewing application 50 obtains from the model 62, the possibly mislabeled documents (calculated through a heuristic as a subset of those for which the reviewer's label does not match the class assigned by the classifier). These are placed in the decision stack 60, which appears between the '+' and the '−' piles. It also shuffles the piles 92, 94, 96, 98 on the left corner of the screen, in order to put the similar documents on the top.

Figure 8:
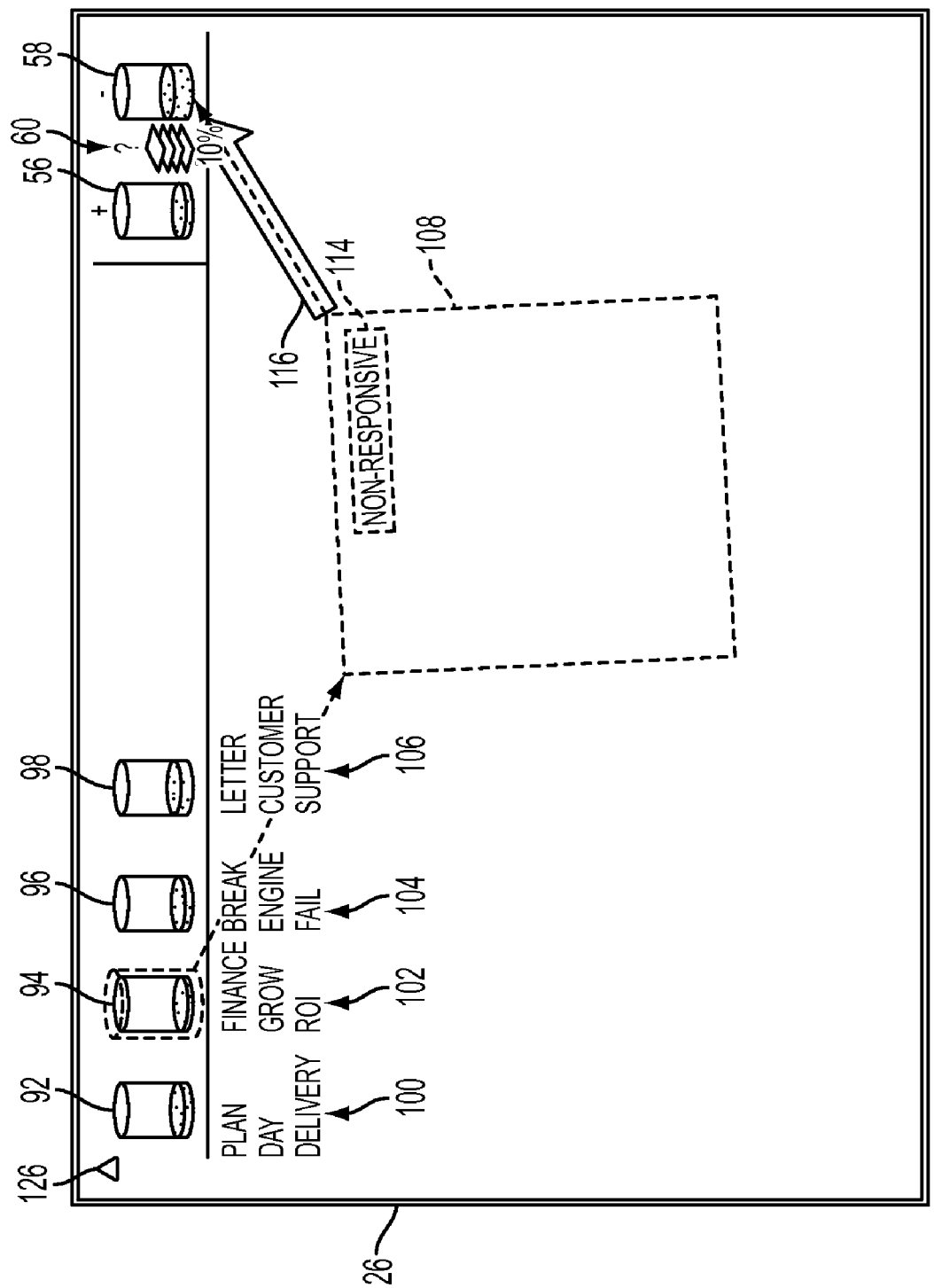
FIG. 8 is a screenshot illustrating automated suggestion of a pile from which the next document should be drawn.

As illustrated in FIG. 8, the user can switch to the "Active Learning" mode by now drawing documents from the highlighted pile (in the example, pile 94). The highlighting, or other identifier, is used to suggest the next document to review (which is generally one very close to the ones reviewed until now or very far). The application may also points to the most likely pile for this document, based on the partially trained model 62, as shown by arrow 116 in the screen shot. If the user decides to place the document in the non-responsive stack 58, a corresponding tag 114, such as an HTML tag, is applied. Even though the pile 94 which has the suggested next document for review on top is highlighted, the user can decide to open a document from another pile, or to open a document from the 'mislabeled' pile 60 to review it again.

After sufficient documents have been tagged (e.g., >100 or >200 documents are labeled) the model 62 that is trained from the user labels is large enough to be used for bulk-categorizing the documents not yet classified; that is, the ones still contained in the four cluster-piles at the left-hand corner. To this end, the user makes the initial wheel-menu 52 visible (for example, by drawing a circle anywhere in a free/empty area of the screen), and selects the 'Use Model' option 120 displayed in the middle (FIG. 9).

Figure 9:
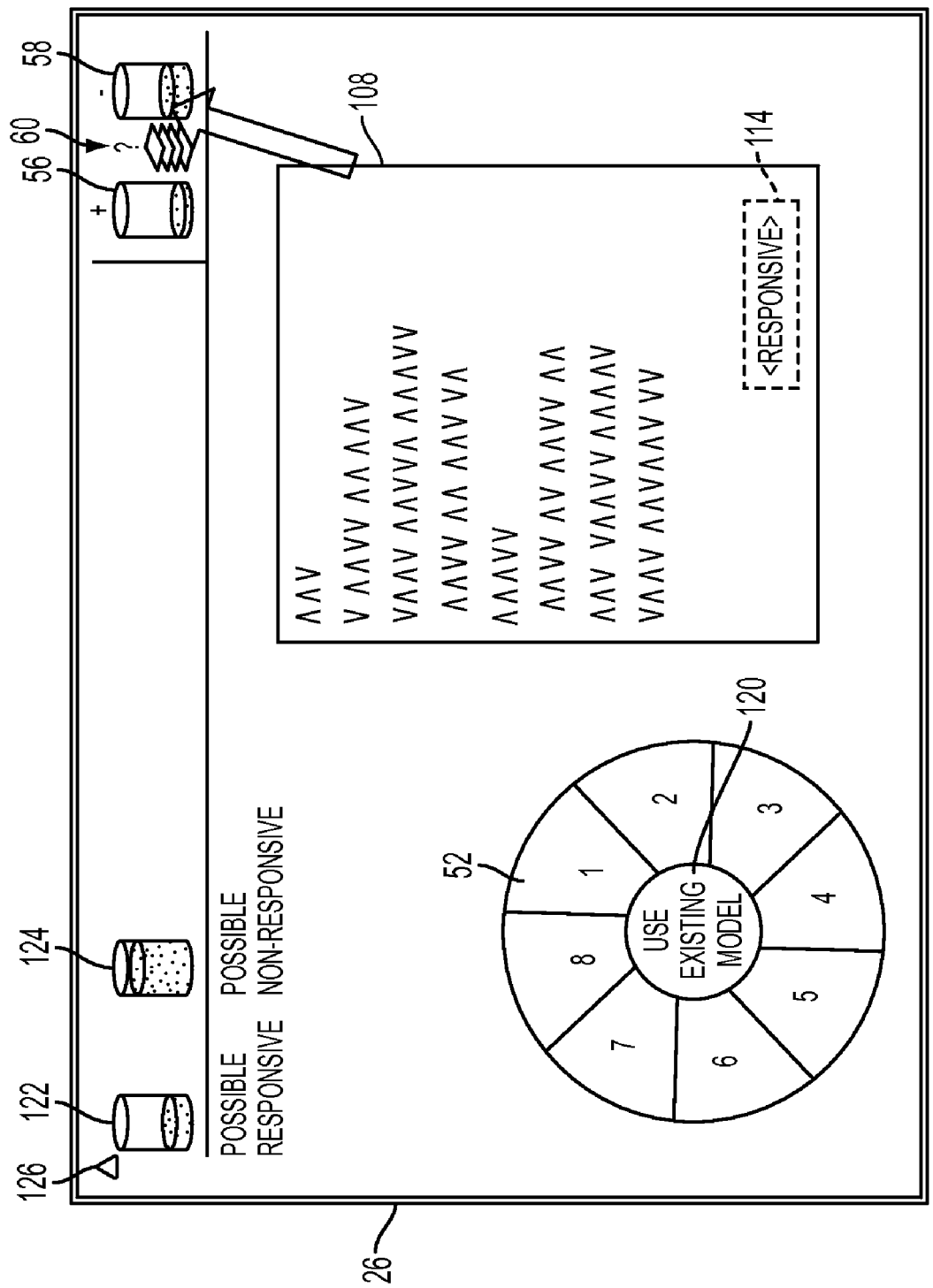
FIG. 9 is a screenshot illustrating an active learning stage in which unannotated documents are automatically reshuffled into piles corresponding to the two classes with which the reviewer annotates documents.

Once all the formerly not-yet-labeled documents have been automatically classified against the reviewer's model 62, the left-hand four cluster piles are replaced by the two piles 122, 124, e.g., "Possibly Responsive," "Possibly Non-Responsive," with the documents still-to-review distributed between these two piles, as illustrated in FIG. 9. In addition, within these piles, the documents are sorted along their likelihood of belonging to their pile, which means that the documents having the highest probability to be Responsive are placed on the top of the "Possibly Responsive" pile, and the ones having the highest probability to be Non-Responsive are placed on the top of the "Possibly Non-Responsive" pile.

The reviewer can continue to review the remaining documents by drawing documents from either of the piles in order to confirm the responsiveness/non-responsiveness of the remaining documents.

Figure 5:
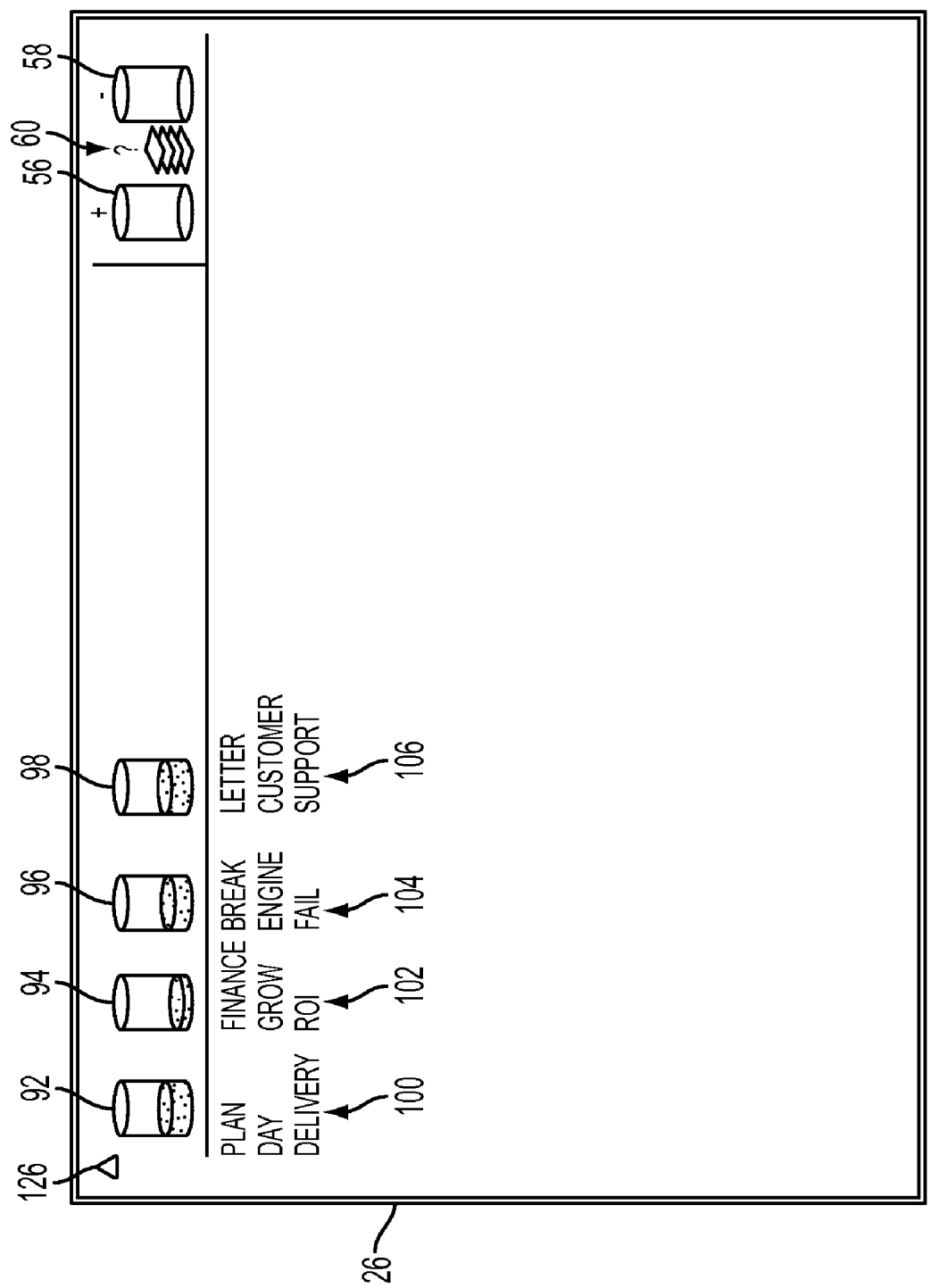
FIG. 5 is a screenshot illustrating unannotated documents separated into piles by clustering, ready for review by a reviewer.

In the case where a preexisting classification model is available, the four piles 92-98 shown in FIG. 5 can be automatically replaced with "Possibly Responsive" and "Possibly Non-Responsive" piles 122, 124, as shown in FIG. 9 at an earlier stage, or the user can be invited to choose a number of clusters in which the documents have to be organized or to load the existing classification model. If the user decides to "Use existing Model" by a finger-click on the center of the menu wheel, a screen analogous to that shown in FIG. 9 appears.

Other interactions not shown in the screenshots are also envisaged, some of which are described below.

Intermediate stages: before a document is moved to either the Responsive or the Non-Responsive stack 56, 58, it can go through several stages. For example, it can remain open and be pushed to the side of the screen for a decision later; it can be moved to another decision stack, or back to its original pile; it can be scaled down, or iconified somewhere on the screen. It can be put side-by side with another opened document for comparison.

Management of the Piles: Possible operations on the different piles of documents may include one or more of: opening a pile and viewing its contents or graphical representations of the documents, creating a pile from several opened documents, merging 2 piles in a single one, or the like.

Multiple-Users: The person designated as the reviewer (or the user) in the embodiments described herein can be a plurality of reviewers, such as two or three people in front of the same display table, who can manipulate the same documents, by moving them, scaling them, highlighting them, reading them jointly. The application does not need to know which gesture or action comes from which person, as long as a final decision is taken, i.e., tagging as Responsive or Non-Responsive. A document goes through one or more of the "intermediate stages" mentioned above in the case of a collaborative review.

Multi-Touch Interface

The multi-touch interface 24 may be designed to be user-friendly, by using graphic elements which simulate handling of paper documents (the "metaphor of the paper"). To provide ample room for reviewing and manipulating documents, a relatively large touch screen display may be employed, e.g., one which is larger, in dimensions, than a sheet of paper (e.g. A4 size or larger), so that the document pages can be reviewed at approximately normal size and with its normal size font without the need to scroll down the screen, while also allowing room for the icons representing the piles and stacks of documents. In this embodiment, a majority of the screen is set aside for the display and manipulation of documents.

A touch-actuable or cursor-actuable arrow icon 126 in the top left-hand corner (see FIG. 9), is provided to enable a temporary cleaning (hiding) of all menu items and icons, to leave the entire plate for manipulating one or several documents (moving, scaling, comparing, reading annotating, grouping) at the same time. After a phase entirely dedicated to document reading and manipulation, the user can switch back to the menu items, and continue the review.

Figure 10:
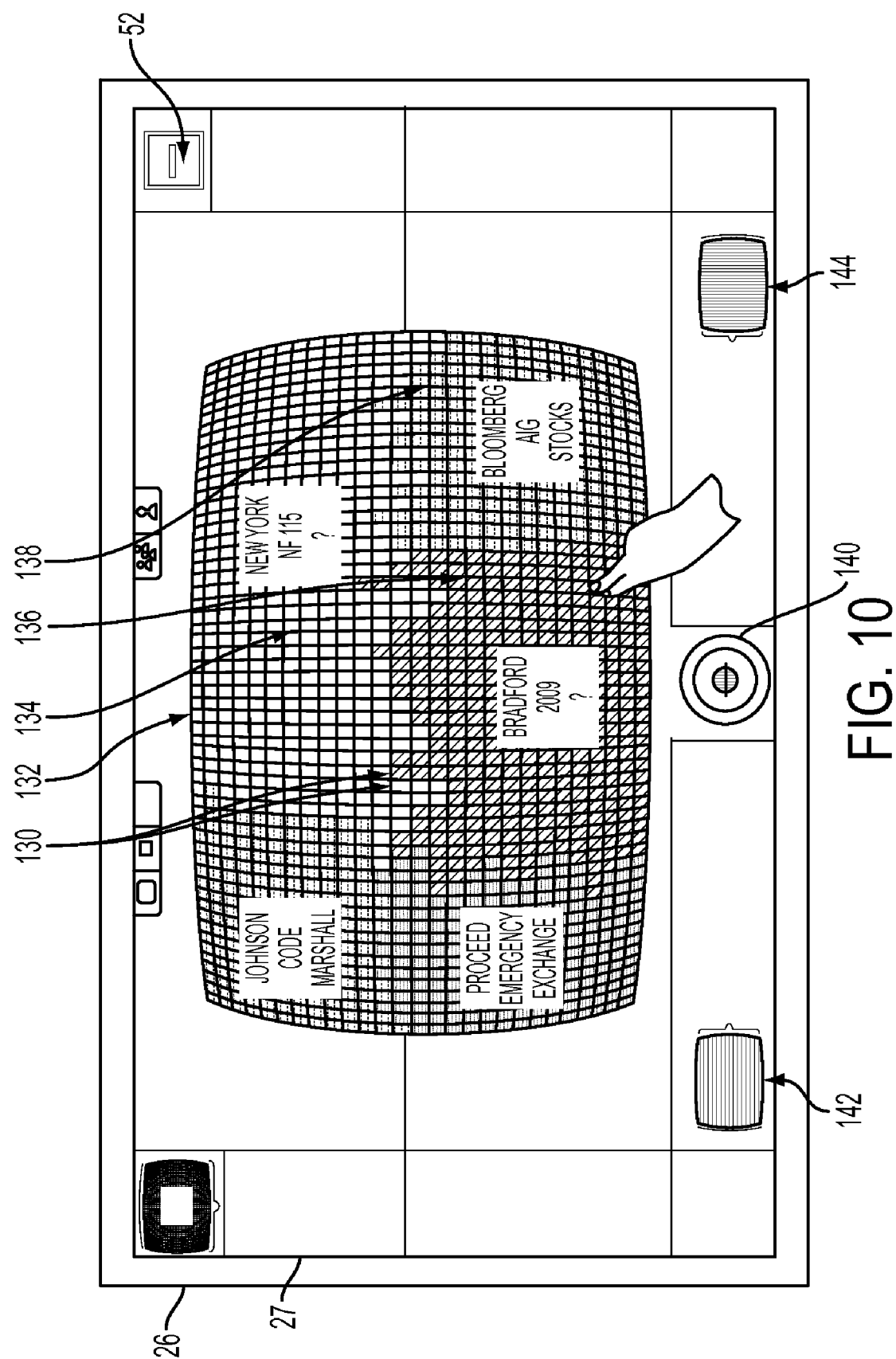
FIG. 10 is a screenshot illustrating another embodiment of a user interface with a virtual magnet, where different colors of the objects and magnet are represented by differences in shading.

In one embodiment, the display is in the form of a multi-touch device. Touch screen interfaces are becoming increasingly popular (iPhone, MS surface table, Multi-Touch $G^2$-Touch Screen Technology from PQ Labs, or the like) as they provide a natural means of interaction. The display detects user contacts and translates their positions to associate them with widgets and commands of the interface. An exemplary device is made up of a 42 inch touch plate which is placed over a horizontal LCD screen making an interactive table. The user has two views of the system: a wall view and a document view. In the first, a wall view presents the documents as tiles 130 (or other graphical objects) in a representative wall 132, as shown in FIG. 10 and is used to manipulate sets of review documents. In the screenshot shown, the document tiles are arranged in regions 134, 136, 138, etc corresponding to their respective clusters. As with the other embodiments, the user is provided with a selector icon 52, which allows the number of clusters to be selected. The user may select one of the clusters for further review by touching the corresponding region, e.g., region 136, of the wall 132 and either move directly into the document view or further filter the cluster.

In the wall view, a virtual magnet 140, as described in co-pending application Ser. No. 12/480,002, filed Jun. 8, 2009, entitled MANIPULATION OF DISPLAYED OBJECTS BY VIRTUAL MAGNETISM, by Caroline Privault, et al., the disclosure of which is incorporated herein in its entirety by reference is optionally employed. The magnet functions to filter documents and draw them towards it, based on attributes of the documents, or otherwise elicits a response, such as a change in color or other appearance characteristic of the graphical objects. The virtual magnet is associated to one of a predefined filtering rule (e.g., filter responsive documents). The user moves the virtual magnet close to the document tiles and the icons of the documents responding to the query are automatically highlighted and/or moved close to the magnet button. More than one magnet can be used at a time to find subsets of documents (e.g., responsive documents ordered by size parameters). These tasks basically amount to clustering and filtering a particular sub-set of documents out of a larger set, although each of them entails one or more complex algorithms.

Figure 11:
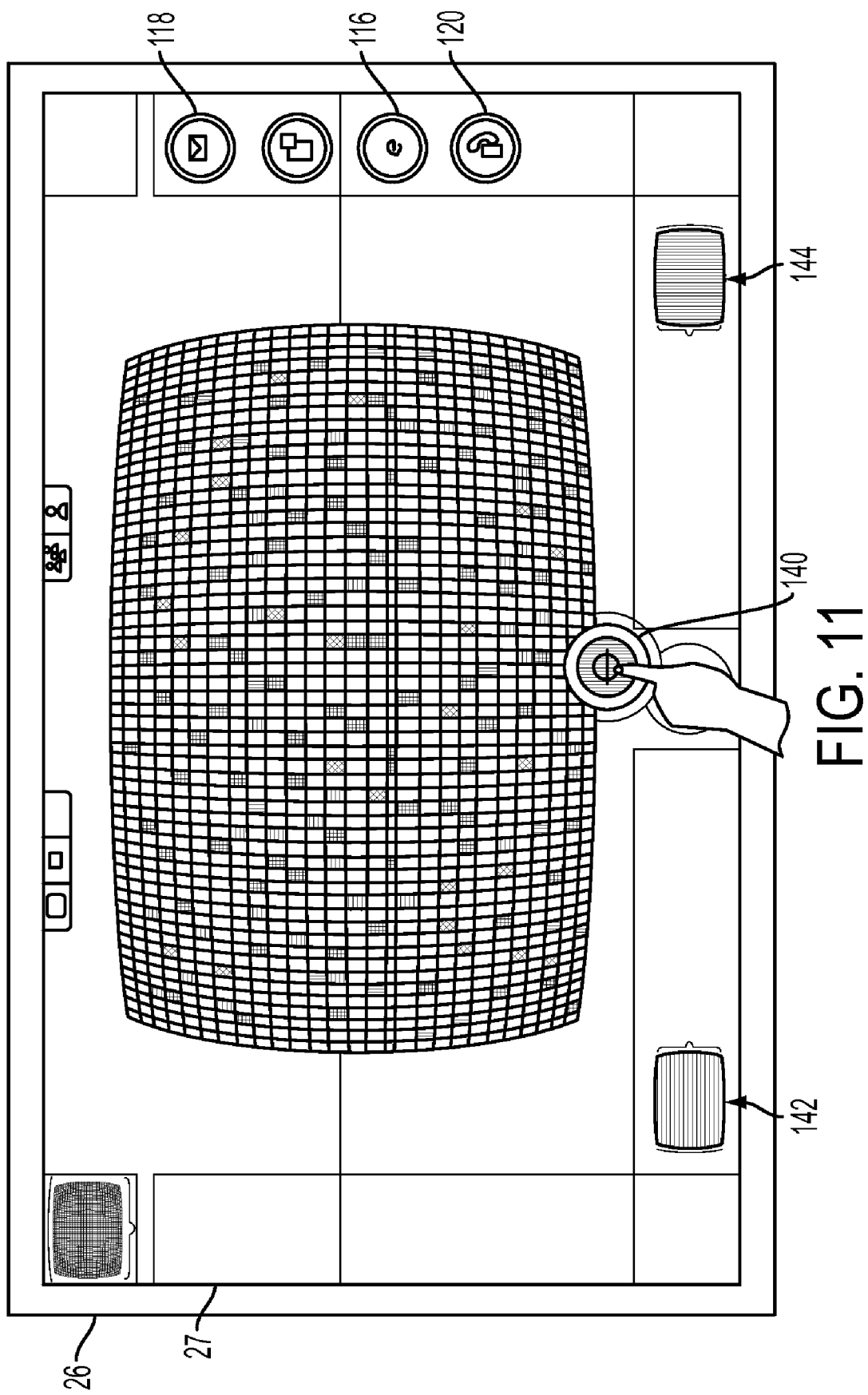
FIG. 11 is a screenshot illustrating the magnet moved to an active position.
Figure 12:
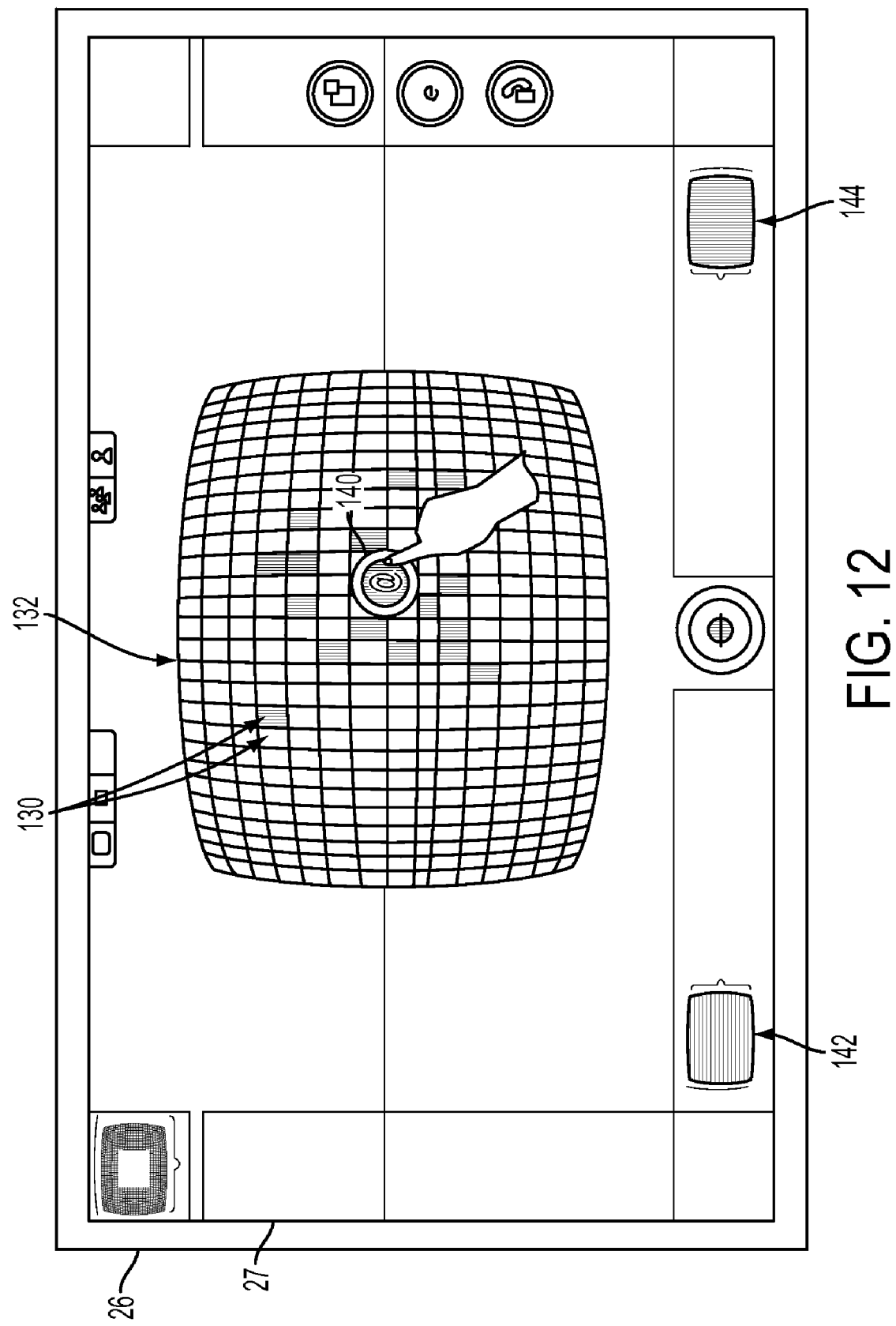
FIG. 12 illustrates document tiles drawn to the magnet based on attributes of the underlying documents.

In the base position, shown in FIG. 10, the magnet 140 is inactive. The magnet can associated with a class of documents by touching one of a plurality of class buttons 142, 144. For example, in the case of the two exemplary classes, Non-Responsive and Responsive, the magnet 140 is associated to one of these classes by touching the respective class button, e.g., button 144. (The magnet may alternatively become active without further action of the user, e.g., when a certain number or training documents, e.g., >100 has been accumulated through reviewer manual tagging, and a classifier built). The magnet is then moved by the reviewer (a drag-and-drop type movement) to a position closer to or within the wall, as shown in FIG. 11 where it is now active. Documents classified by the classifier as Responsive are highlighted in the wall and may move toward the magnet (FIG. 12). The function associated with the magnet may further return a level of eligibility for each document to be responsive, and the elected documents are displayed around the magnet button 140 to different distances, reflecting their degree of responsiveness, or with different colors. For example, documents most likely to be responsive (according to the classifier) are placed closest to the magnet button and are highlighted in red.

Figure 13:
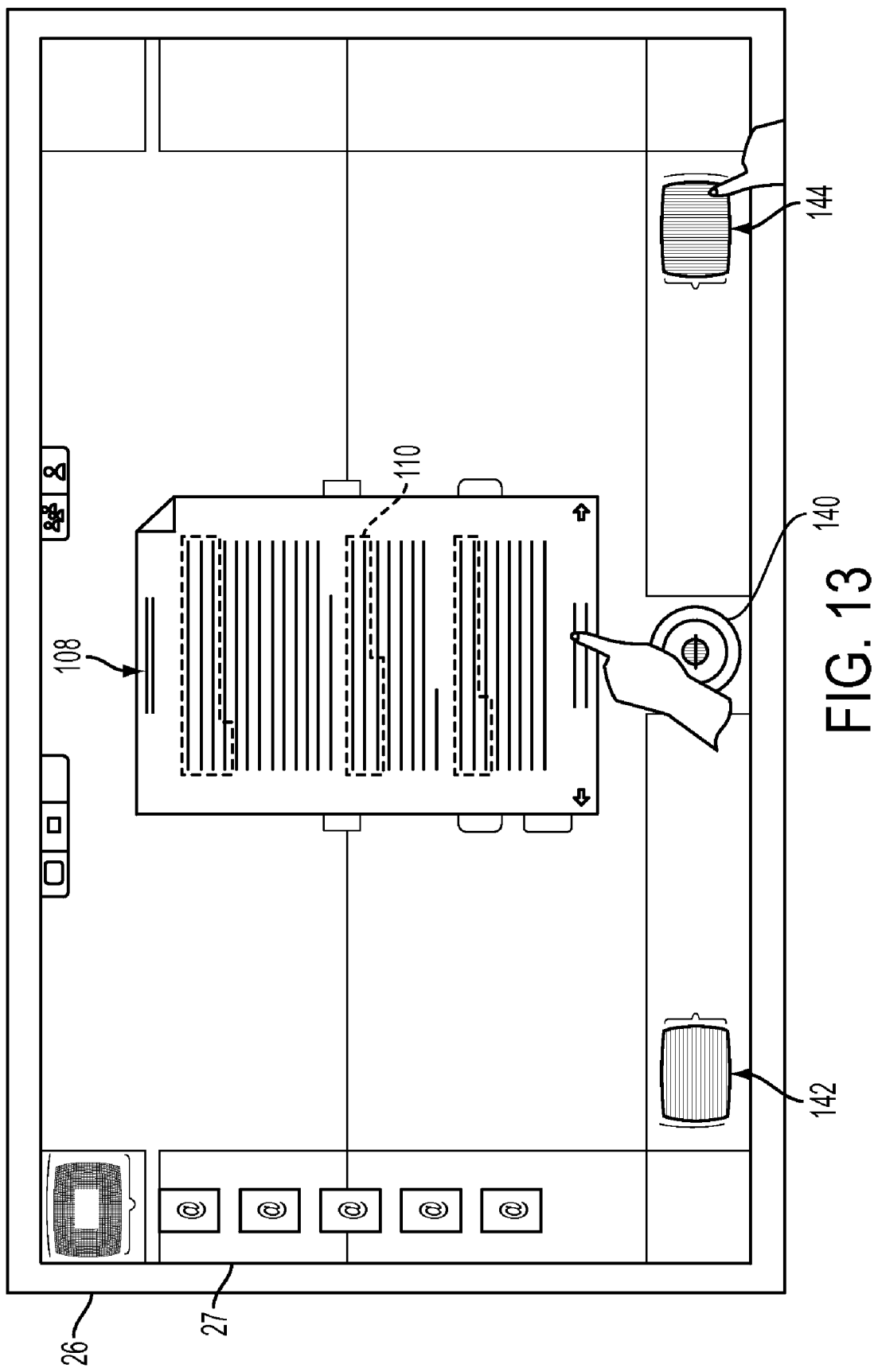
FIG. 13 illustrates a document opened for review, showing user annotations.

The document view presents one or more documents 108 (FIG. 13) and is used when documents are being read and reviewed. The surface is large enough to simulate a user desk and display documents in almost A4 format, like real paper, and can be used individually or collaboratively. In the document view, the system presents documents to be reviewed from the subset the user has selected. Documents can be manipulated through natural gestures, such as rotations, scaling, moving, opening closing etc. Text can be highlighted, corners turned to indicate highly responsive document status and simple actions move the documents to the responsive/nonresponsive bins. For example, the reviewer touches an icon (e.g., icon 144) to move the document to the responsive bin. The reviewers can also organize their desks almost physically, piling documents, putting documents to one side and moving menu artifacts and buttons to a more convenient place. The system enables collaborative reviews, such as the discussion and comparison of difficult documents to improve review accuracy. Several reviewers can stand around the table and manipulate the same set of documents, through duplication and shared highlighting and so on. The touch plate can also become the place where a review administrator can monitor review results and improve performance by inviting reviewers to discuss their tagging decisions, or focusing on particular documents with senior attorneys.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of reviewing documents comprising:
partitioning a collection of documents into sets of documents for review by a plurality of reviewers;
for each set:
organizing the documents in the set into a plurality of groups,
displaying documents in the set on a display device for review by a reviewer,
receiving the reviewer's labels for the displayed documents,
based on the reviewer's labels, assigning a class from a plurality of classes to each of the reviewed documents,
progressively training a classifier model stored in computer memory based on features extracted from the reviewed documents in the set and their assigned classes; and
prior to review of all documents in the set, identifying documents in the set for which the classifier model assigns a class different from the one assigned based on the reviewer's label and returning a subset of the identified documents for a second review by a reviewer.

2. The method of claim 1, further comprising classifying the documents in a first of the sets of documents with a second classifier model trained on features of reviewed documents in a second of the sets of documents and their assigned classes.

3. The method of claim 2, further comprising identifying documents in the first set which the trained second classifier model assigns a class different from the one assigned based on the reviewer's label.

4. The method of claim 3, further comprising measuring a quality of the review of the first set of documents based on the identified documents.

5. The method of claim 2, further comprising, for each set of documents, measuring a quality of the review of the documents in the set, the measure of quality of the review of each set being a function of at least one of:
a number of documents for which the classifier model trained on that set outputs a different class from the class assigned based on the reviewer's label; and
a number of documents for which at least one classifier model trained on another of the sets outputs a different class from the class assigned based on the reviewer's label.

6. The method of claim 1, wherein the returning of the subset of the documents for a second review by a reviewer includes applying a heuristic to the documents for which the classifier model assigns a class different from the one assigned based on the reviewer's label to identify mislabeled documents to be returned.

7. The method of claim 1, further comprising classifying unlabeled documents in the set with the classifier model trained on already labeled documents in the set.

8. The method of claim 7, further comprising suggesting an unlabeled document for review by the reviewer which is determined to be similar to an already labeled document in the set.

9. The method of claim 7, further comprising, separating the unlabeled documents in the set into piles, one pile for each class, the separation being based on the classes assigned to the unlabeled documents by the trained classifier model.

10. The method of claim 9, further comprising graphically representing the piles on the display.

11. The method of claim 7, further comprising, suggesting a label for an unlabeled document being reviewed by the reviewer based on the trained classifier model.

12. The method of claim 1, wherein the organizing of the documents into groups comprises automatically clustering the documents in the set into a plurality of clusters based on similarity of extracted features and displaying graphical representations of the clusters on the display.

13. The method of claim 12, further comprising displaying, for each cluster, at least one feature of the documents which resulted in documents being clustered in the cluster.

14. The method of claim 12, further comprising displaying a selector for enabling the reviewer to select how many clusters are generated.

15. The method of claim 1, wherein the sets of documents are generated by automated clustering of the collection of documents.

16. The method of claim 15, wherein the clustering is one of unsupervised clustering or partially supervised clustering in which a portion of the documents are manually assigned to clusters.

17. The method of claim 1, wherein the display comprises a multi-touch interface.

18. The method of claim 17, wherein the multi-touch interface enables contemporaneous review and interaction with the displayed documents by a team of reviewers.

19. The method of claim 1, wherein there are at least three sets of documents and wherein at least three classifier models are trained, one classifier model for each of the sets of documents, the method including comparing the classes assigned to the documents in the first set based on the labels of the reviewer with classes assigned by at least two classifiers to the first set of documents, which classifiers have not been trained on the first set of the documents.

20. A computer program product encoding instructions which, when executed by a computer, performs the method of claim 1.

21. A reviewing system comprising:
memory which stores a set of documents for review;
a display which displays documents in the set;
a user input device for receiving information from which class labels applied to the documents by a reviewer are determined;
a classifier model which is progressively trained based on the applied class labels;
a document reviewing application stored in memory which, prior to all documents in the set being labeled, compares a class assigned by the classifier for a labeled document to the label applied by the reviewer and identifies labeled documents where the class label applied by the reviewer does not match the class assigned by the reviewer and returns, for a second review, a subset of the identified labeled documents.

22. The reviewing system of claim 21, further comprising:
an assessment component for evaluating the review which compares class labels assigned to the documents in a first of the sets of documents with classes assigned by a second classifier model trained on features of reviewed documents in a second of the sets of documents and their assigned classes.

23. A method of reviewing documents comprising:
partitioning a collection of documents into sets of documents;
for a first of the sets of documents, generating a first classifier model based on reviewer-applied labels for documents in the first set;
for a second of the sets of documents, generating a second classifier model based on reviewer-applied labels for documents in the second set; and
assessing a quality of the labels applied to the first set of documents including:
assigning classes to the documents from the first set of documents with the second classifier model, and
comparing the reviewer-applied labels of the documents in the first set with the classes assigned by the second classifier model to identify documents for which the reviewer-applied labels do not match the assigned classes.

\* \* \* \* \*